(12) United States Patent
Malakhov et al.

(10) Patent No.: US 11,671,632 B2
(45) Date of Patent: Jun. 6, 2023

(54) MACHINE-LEARNING-BASED ADAPTATION OF CODING PARAMETERS FOR VIDEO ENCODING USING MOTION AND OBJECT DETECTION

(71) Applicant: Huawei Technologies Co., Ltd., Shenzhen (CN)

(72) Inventors: Kirill Aleksandrovich Malakhov, Saint Petersburg (RU); Hu Chen, Munich (DE); Zhijie Zhao, Munich (DE); Dmitry Vadimovich Novikov, Saint Petersburg (RU); Marat Ravilevich Gilmutdinov, Saint Petersburg (RU)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/171,262

(22) Filed: Feb. 9, 2021

(65) Prior Publication Data

US 2021/0168408 A1 Jun. 3, 2021

Related U.S. Application Data

(63) Continuation of application No. PCT/RU2018/000530, filed on Aug. 14, 2018.

(51) Int. Cl.
*H04N 19/96* (2014.01)
*H04N 19/124* (2014.01)
(Continued)

(52) U.S. Cl.
CPC ............. *H04N 19/96* (2014.11); *G06N 20/00* (2019.01); *H04N 19/124* (2014.11); *H04N 19/176* (2014.11); *H04N 19/52* (2014.11)

(58) Field of Classification Search
CPC .............................. H04N 19/96; H04N 19/52
See application file for complete search history.

(56) References Cited

U.S. PATENT DOCUMENTS 6,075,884 A 6/2000 Lubin et al.
6,650,705 B1 * 11/2003 Vetro ....................... G06T 9/20
375/240.08

(Continued)

FOREIGN PATENT DOCUMENTS

WO 9835318 A1 8/1998
WO 2017219353 A1 12/2017

OTHER PUBLICATIONS

Schmidt, A., et al., "Multiple and Modular Artificial Neural Networks," Oct. 4, 2000, retrieved from https://www.teco.edu/~albrecht/neuro/html/node32.html, 2 pages.

(Continued)

*Primary Examiner* — Zhubing Ren
(74) *Attorney, Agent, or Firm* — Conley Rose, P.C.

(57) ABSTRACT

A method for encoding a video image using coding parameters, adapted on the basis of motion of the video image and of an output of a machine-learning based model, wherein the machine-learning based model is input with samples of a block of the video image and motion information of the samples, and along with texture, wherein the machine-learning model segments the video image into regions based on strength of the motion determined from the motion information. An object is detected within the video based on the motion and the texture, and spatial-time coding parameters are determined based on the strength of the motion, and whether or not the detected objects moves.

20 Claims, 16 Drawing Sheets

(51) Int. Cl.
  *H04N 19/176* (2014.01)
  *H04N 19/52* (2014.01)
  *G06N 20/00* (2019.01)

(56) References Cited

U.S. PATENT DOCUMENTS

| | | | | |
|---|---|---|---|---|
| 2001/0017887 | A1* | 8/2001 | Furukawa | H04N 19/172 |
| | | | | 375/E7.211 |
| 2003/0048846 | A1 | 3/2003 | Lee | |
| 2006/0256857 | A1 | 11/2006 | Chin | |
| 2007/0076957 | A1* | 4/2007 | Wang | H04N 19/17 |
| | | | | 375/E7.182 |
| 2008/0123741 | A1 | 5/2008 | Li et al. | |
| 2012/0170918 | A1* | 7/2012 | Ohbitsu | H04N 19/174 |
| | | | | 386/355 |
| 2013/0322524 | A1* | 12/2013 | Jang | H04N 19/167 |
| | | | | 375/240.03 |
| 2014/0245367 | A1* | 8/2014 | Sasaki | H04N 21/6175 |
| | | | | 725/109 |
| 2015/0334398 | A1* | 11/2015 | Socek | G06T 7/194 |
| | | | | 375/240.26 |
| 2016/0057418 | A1* | 2/2016 | Lei | H04N 19/60 |
| | | | | 375/240.03 |
| 2016/0335754 | A1* | 11/2016 | Aaron | G06T 9/002 |
| 2018/0284872 | A1* | 10/2018 | Schluessler | G06F 9/5083 |
| 2019/0141335 | A1* | 5/2019 | Nishi | H04N 19/139 |

OTHER PUBLICATIONS

Braham, M., et al., "Deep Background Subtraction with Scene-Specific Convolutional Neural Networks," International Conference on Systems, Signals and Image Processing (IWSSIP), Bratislava, 2016, 5 pages.

Kim, I., et al., "Block Partitioning Structure in the HEVC Standard," IEEE Transactions on Circuits and Systems for Video Technology, vol. 22, No. 12, Dec. 2012, pp. 1697-1706.

* cited by examiner

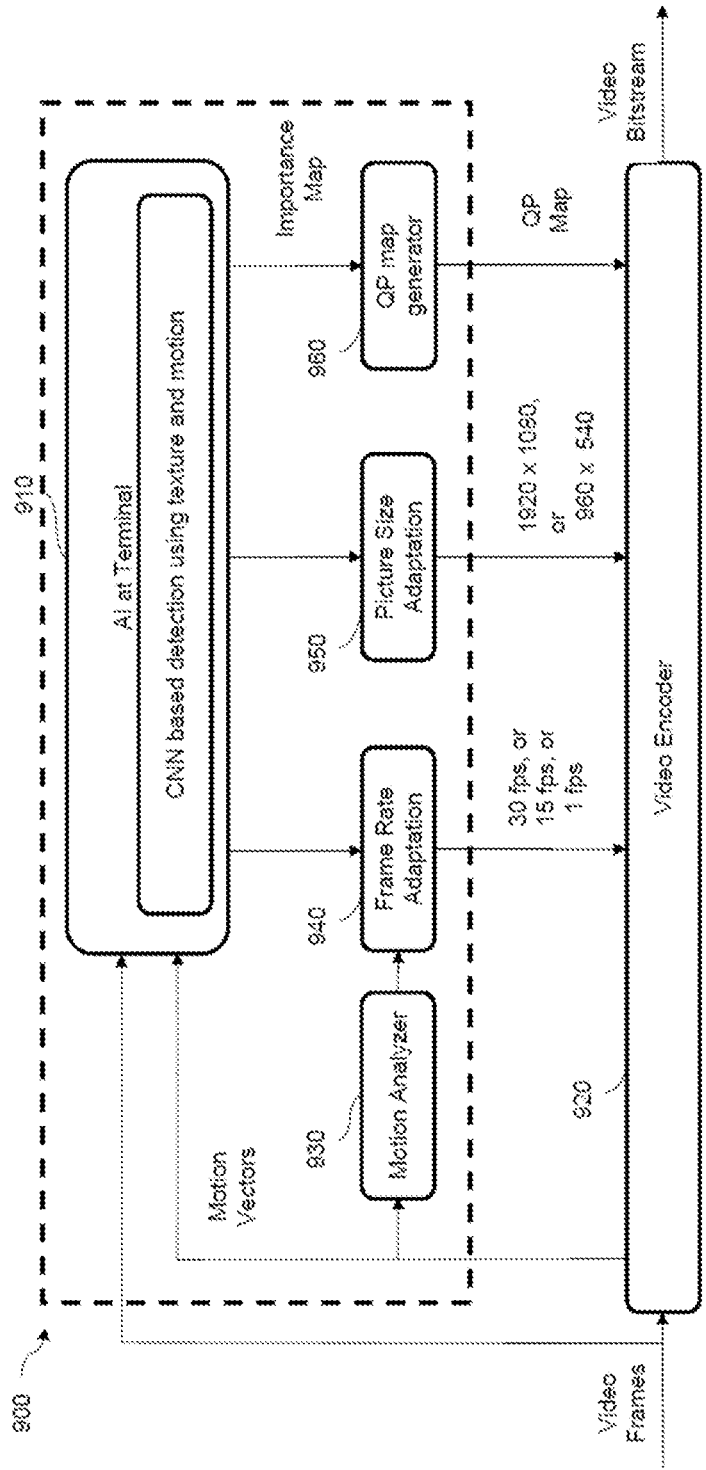

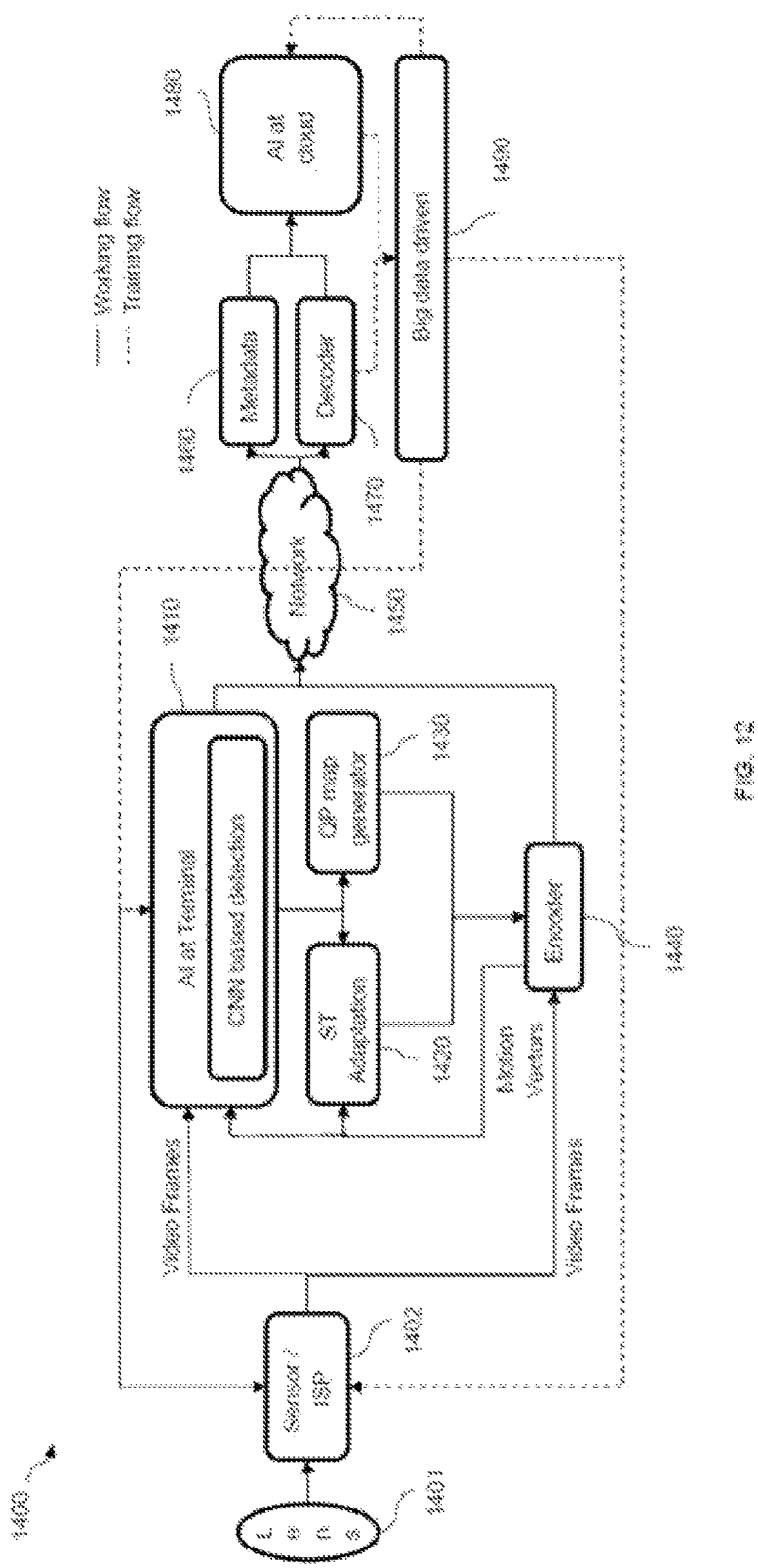

MACHINE-LEARNING-BASED ADAPTATION OF CODING PARAMETERS FOR VIDEO ENCODING USING MOTION AND OBJECT DETECTION

CROSS-REFERENCE TO RELATED APPLICATIONS

This application is a continuation application of International Patent Application No. PCT/RU2018/000530 filed on Aug. 14, 2018, which is hereby incorporated by reference in its entirety.

TECHNICAL FIELD

The present disclosure relates to encoding of video images using coding parameters.

BACKGROUND

Video coding (video encoding and decoding) is used in a wide range of digital video applications, for example broadcast digital television (TV), video transmission over Internet and mobile networks, real-time conversational applications such as video chat, video conferencing, digital versatile disc (DVD) and BLU-RAY DISCs, video content acquisition and editing systems, and camcorders of security applications.

Since the development of the block-based hybrid video coding approach in the H.261 standard in 1990, new video coding techniques and tools were developed and formed the basis for new video coding standards. One of the goals of most of the video coding standards was to achieve a bitrate reduction compared to its predecessor without sacrificing picture quality. Further video coding standards comprise Moving Picture Experts Group (MPEG)-1 video, MPEG-2 video, International Telecommunication Union (ITU) Telecommunication Standardization Sector (ITU-T) H.262/MPEG-2, ITU-T H.263, ITU-T H.264/MPEG-4, Part 10, Advanced Video Coding (AVC), ITU-T H.265, High Efficiency Video Coding (HEVC), and extensions, e.g. scalability and/or three-dimensional (3D) extensions, of these standards.

In standard video encoders and decoders compatible with H.264/AVC or HEVC (H.265) or next generations, the coding parameters, for example, frame rate, picture size or quantization parameter (QP), used for video image encoding are often preset and signaled to the encoder. However, in particular for video surveillance applications a key problem is how to determine these coding parameters for an optimized performance of the computer vision device. In surveillance problems, a key aspect is to detect whether interesting objects, such as persons, motor vehicles or non-motor vehicles and the like, even exist in the video image apart from the image background, whether these objects move and how fast. Dependent on these factors, the coding parameters may be adapted on the fly so as to achieve an optimal surveillance result.

SUMMARY

Embodiments are defined by the features of the independent claims, and further advantageous implementations of the embodiments by the features of the dependent claims.

According to an aspect of the present disclosure, an apparatus is provided for encoding samples of a video image comprising a processing circuitry configured to determine motion information for a sample in the video image, determine a coding parameter based on an output of a machine-learning-based model, to which the motion information and the sample are input, and encode the sample by applying the coding parameter.

The use of a machine-learning-based model may provide an advantage of improving the determination of coding parameters by utilizing machine-learning models, which classify video images based on motion information.

In one exemplary implementation of the present disclosure, said sample is one of a predetermined number of samples in a block and the motion information for the sample is determined based on a motion vector of the block.

According to an aspect of the present disclosure, the processing circuitry of the apparatus is further configured to divide the video image into equally sized coding tree units (CTUs), hierarchically split one of the coding tree units into a plurality of coding units, determine motion vector for each of the plurality of the coding units, input to the machine-learning-based model the coding tree unit and the respective motion vectors determined for the plurality of the coding units of the coding tree unit.

The provision of the input to the machine-learning model, including the video image and motion vector, in data pieces of a coding tree may provide an advantage of ensuring compatibility with standard video codes.

According to an aspect of the present disclosure, processing circuitry is configured to input to the machine-learning-based model (i) the coding tree unit, (ii) a block of the size of the coding tree unit including for each sample of the coding tree unit a horizontal component of the motion vector of the coding unit to which said sample belongs, and (iii) a block of the size of the coding tree unit including for each sample of the coding tree unit a vertical component of the motion vector of the coding unit to which said sample belongs.

In one exemplary embodiment of the present disclosure, the machine-learning-based model includes a first machine-learning-based sub-model to which the coding tree unit is input, a second machine-learning-based sub-model to which the motion vectors are input, and a third machine-learning-based sub-model to which an output of the first machine-learning-based sub-model and an output of the second machine-learning-based sub-model is input.

This may provide an advantage of performing pre-processing of the input data by the intermediate first and second sub-models in a separate manner. In particular, the pre-processing by the intermediate sub-models may include a separate classification of the input data, including the motion vector components and the coding tree unit, with each sub-model being optimized for its particular type of input. As a result, the coding parameter adaptation may be more accurate.

According to an aspect of the present disclosure, the machine-learning-based model is configured to classify the input sample as belonging to a region of interest (ROI) or to a region of non-interest (RONI).

According to an aspect of the present disclosure, the processing circuitry is further configured to obtain as the output of the machine-learning-based model a map specifying the ROI and RONI of the video image, wherein the map includes for each sample or block of samples an indication on whether said sample or block of samples belongs to the ROI or RONI.

This may provide the advantage of adapting the coding parameter in a fast manner by use of the ROI-RONI map.

According to an aspect of the present disclosure, the machine-learning-based model is configured to detect, using the machine-learning-based model, an object within the video image.

For instance, the processing circuitry is configured to determine the coding parameter by adapting frame rate of the video images according to motion.

In one exemplary implementation, processing circuitry is further configured to calculate the motion for a sample based on a metric of the motion vector of a block in which the sample is located.

According to an aspect of the present disclosure, the processing circuitry is further configured to adapt the frame rate by setting the frame rate higher in case an object was detected in the video frame than in case no object was detected, and/or setting the frame rate in accordance with the amount of the motion detected in the video image.

This may provide the advantage of optimizing coding parameters for objects of different sizes and are moving at different speed. In particular, the coding parameters for small and fast-moving objects may be tuned to achieve an optimal encoded video image.

In one exemplary embodiment of the present disclosure, the processing circuitry is configured to determine the coding parameter by adapting spatial resolution based on whether or not an object was detected in the video image.

In one exemplary embodiment of the present disclosure, the processing circuitry is further configured to set a higher spatial resolution in a case when an object was detected in the video image than in a case when no object was detected in the video image, and the spatial resolution is a number of samples per video image.

The dependency of the coding parameter adaptation on the object detection result and the strength of the object motion may provide the advantage of determining more accurate coding parameters depending on the presence of an object and its moving characteristics within the video image.

For instance, the coding parameter related to the spatial resolution is QP.

In one exemplary embodiment of the present disclosure, the processing circuitry is further configured to set the quantization parameter for a sample lower in a case when the sample belongs to ROI than in a case when the sample belongs to RONI.

The coding parameter adaptation by the combined use of ROI-RONI and object detection may provide the advantage of a fast and more accurate background extraction and small object detection under fast altering environments, as relevant for video surveillance, computer-vision driven video (en)coding, or autonomous driving, where both texture, motion, and object detection are important.

According to an aspect of the present disclosure, a method is provided for encoding samples of a video image comprising the steps of determining motion information for samples of a block in the video image, determining a coding parameter based on an output of a machine-learning-based model, to which the motion information and the samples of the block are input, and encoding the video frame by applying the coding parameter.

According to an aspect of the present disclosure, the method comprises further the steps of dividing the video image into equally sized coding tree units, hierarchically splitting one of the coding tree units into a plurality of coding units, determining motion vector for each of the plurality of the coding units, inputting to the machine-learning-based model the coding tree unit and the respective motion vectors determined for the plurality of the coding units of the coding tree unit.

According to an aspect of the present disclosure, the method comprises further the steps of inputting to the machine-learning-based model (i) the coding tree unit, (ii) a block of the size of the coding tree unit including for each sample of the coding tree unit a horizontal component of the motion vector of the coding unit to which said sample belongs, and (iii) a block of the size of the coding tree unit including for each sample of the coding tree unit a vertical component of the motion vector of the coding unit to which said sample belongs.

In one exemplary implementation of the present disclosure, the method steps related to the machine-learning-based model include the steps of inputting the coding tree unit to a first machine-learning-based sub-model, inputting the motion vectors to a second machine-learning-based sub-model, and inputting to a third machine-learning-based sub-model an output of the first machine-learning-based sub-model and an output of the second machine-learning-based sub-model.

In one exemplary implementation of the present disclosures, the method includes the step of classifying by the machine-learning-based model the input sample as belonging to a ROI or to a RONI.

According to an aspect of the present disclosure, the method steps include obtaining as the output of the machine-learning-based model a map specifying the ROI and RONI of the video image, wherein the map includes for each sample or block of samples an indication on whether said sample or block of samples belongs to the ROI or RONI.

In one exemplary implementation of the resent disclosure, the method includes further the step of detecting, using the machine-learning-based model, an object within the video image.

In one exemplary implementation of the resent disclosure, the method steps include further determining the coding parameter by adapting frame rate of the video images according to motion.

For instance, the method step includes calculating the motion for a sample based on a metric of the motion vector of a block in which the sample is located.

According to an aspect of the present disclosure, the method includes adapting the frame rate by setting the frame rate higher in case an object was detected in the video frame than in case no object was detected, and/or setting the frame rate in accordance with the amount of the motion detected in the video image.

In one exemplary embodiment of the present disclosure, the method includes the step of determining the coding parameter by adapting spatial resolution based on whether or not an object was detected in the video image.

According to an aspect of the present disclosure, the method steps include further setting a higher spatial resolution in a case when an object was detected in the video image than in a case when no object was detected in the video image, and the spatial resolution is a number of samples per video image.

In one exemplary embodiment of the present disclosure, the method steps include setting the quantization parameter for a sample lower in a case when the sample belongs to ROI than in a case when the sample belongs to RONI.

According to an aspect of the present disclosure, a computer-readable non-transitory medium is provided for storing a program, including instructions which when executed on a processor cause the processor to perform the method steps.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments are described in more detail with reference to the attached figures and drawings.

FIG. 9 is a block diagram of an apparatus according to an embodiment, including various modules for machine-learning and coding parameter adaptation.

FIG. 12 is a block diagram of a system with a machine-learning model, ST adaptation, QP map generator and encoder, along with image capturing elements and cloud outsourcing.

Figure 1:
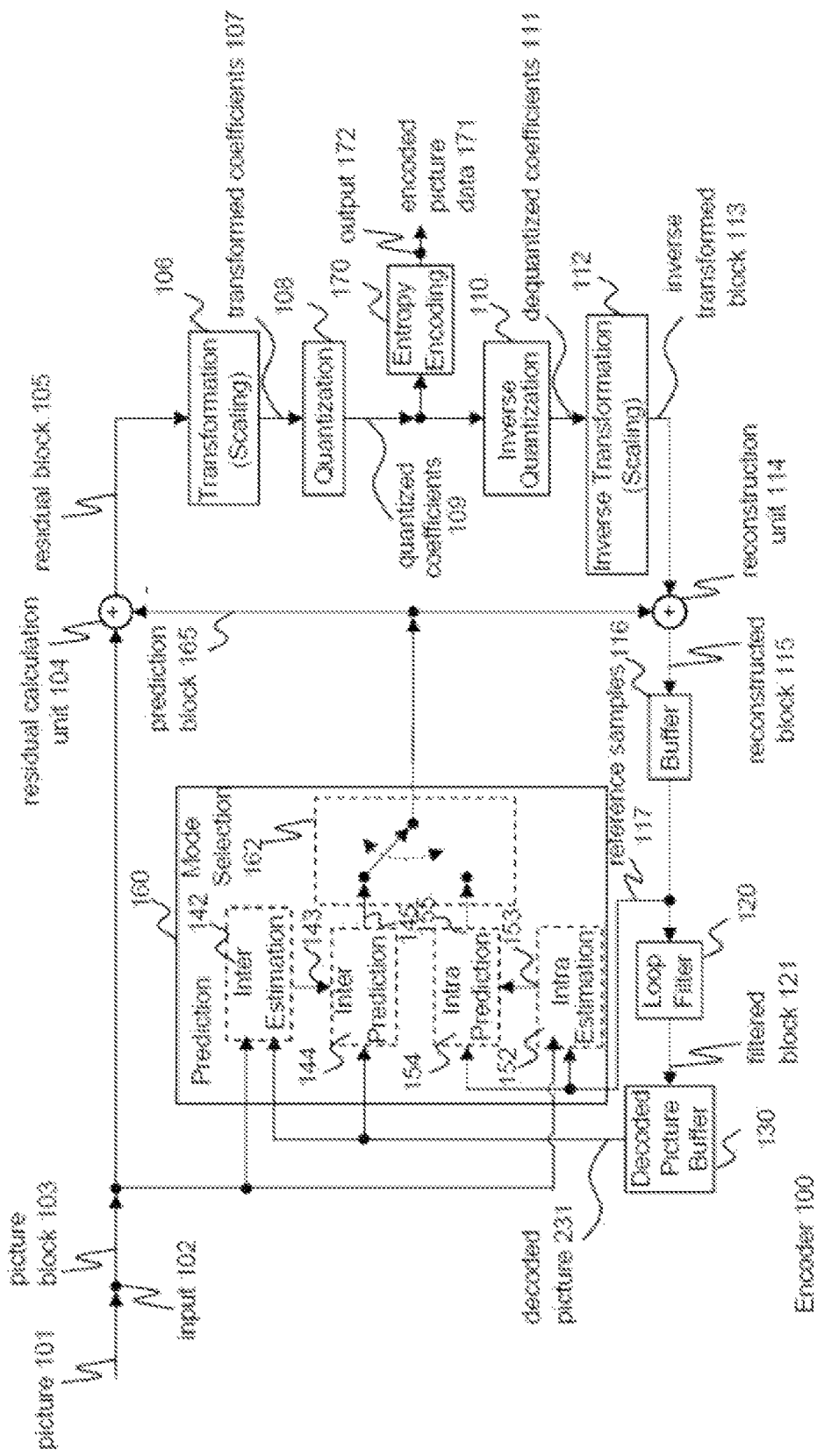
FIG. 1 is a block diagram showing an example of a video encoder configured to implement embodiments of the disclosure.

In the following, identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, specific aspects of embodiments or specific aspects in which the described embodiments may be used. It is understood that embodiments may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless further noted otherwise.

Video coding typically refers to the processing of a sequence of pictures, which form the video or video sequence. Instead of the term picture the terms frame or image may be used as synonyms in the field of video coding. Video coding comprises two parts, video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general, as will be explained later) shall be understood to relate to both, "encoding" and "decoding" of video pictures. The combination of the encoding part and the decoding part is also referred to as CODEC (COding and DECoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards since H.261 belong to the group of "lossy hybrid video codecs" (i.e. combine spatial and temporal prediction in the sample domain and two-dimensional (2D) transform coding for applying quantization in the transform domain). Each picture of a video sequence is typically partitioned into a set of non-overlapping blocks and the coding is typically performed on a block level. That is, at the encoder the video is typically processed, i.e. encoded, on a block (video block) level, e.g. using spatial (intra picture) prediction and temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

As video picture processing (also referred to as moving picture processing) and still picture processing (the term processing comprising coding), share many concepts and technologies or tools, in the following the term "picture" is used to refer to a video picture of a video sequence (as explained above) and/or to a still picture to avoid unnecessary repetitions and distinctions between video pictures and still pictures, where not necessary. In case the description refers to still pictures (or still images) only, the term "still picture" shall be used.

In the following, embodiments of an encoder 100, a decoder 200 and a coding system 300 are described based on FIGS. 1 to 3 (before describing embodiments in more detail based on FIGS. 8 to 12).

Figure 3:
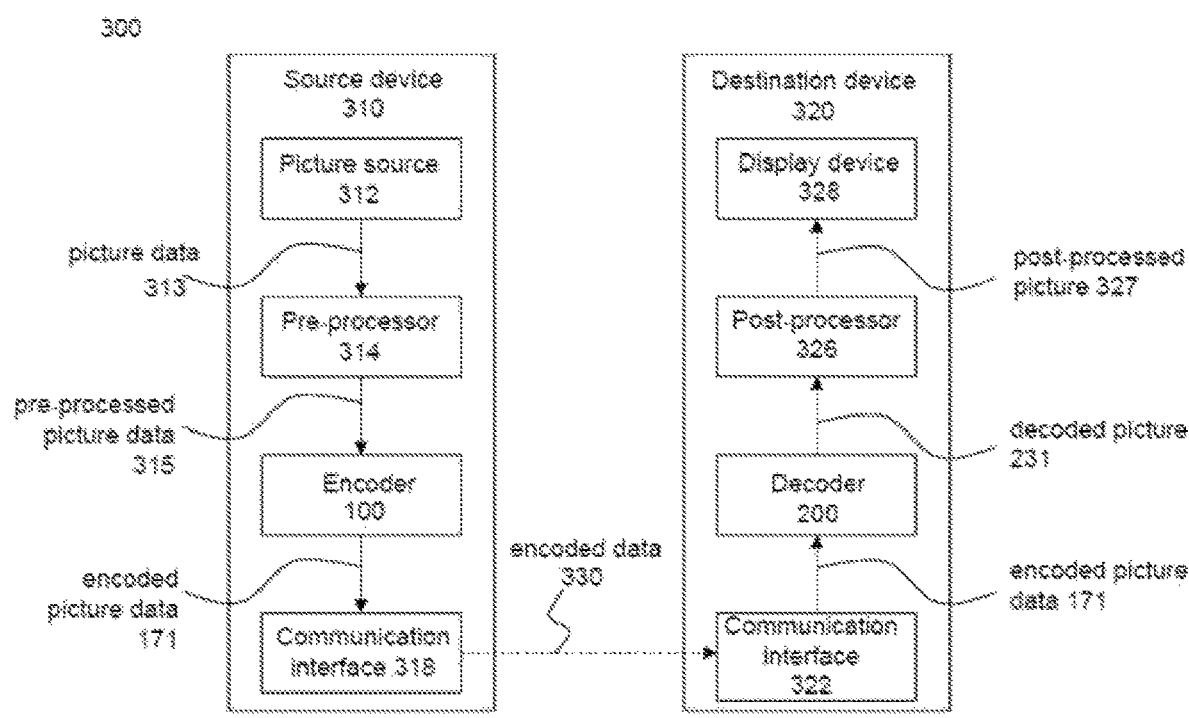
FIG. 3 is a block diagram showing an example of a video coding system configured to implement embodiments of the disclosure.

FIG. 3 is a schematic block diagram illustrating an embodiment of a coding system 300, e.g. a picture coding system 300, wherein the coding system 300 comprises a source device 310 configured to provide encoded data 330, e.g. an encoded picture 330, e.g. to a destination device 320 for decoding the encoded data 330.

The source device 310 comprises an encoder 100 or encoding unit 100, and may additionally, i.e. optionally, comprise a picture source 312, a pre-processing unit 314, e.g. a picture pre-processing unit 314, and a communication interface or communication unit 318.

The picture source 312 may comprise or be any kind of picture capturing device, for example for capturing a real-world picture, and/or any kind of a picture generating device, for example a computer-graphics processor for generating a computer animated picture, or any kind of device for obtaining and/or providing a real-world picture, a computer animated picture (e.g. a screen content, a virtual reality (VR) picture) and/or any combination thereof (e.g. an augmented reality (AR) picture). In the following, all these kinds of pictures and any other kind of picture will be referred to as "picture", unless further described otherwise, while the previous explanations with regard to the term "picture" covering "video pictures" and "still pictures" still hold true, unless explicitly specified differently.

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance/chrominance format or color space, e.g. YCbCr, which comprises a luminance component indicated by Y (or L) and two chrominance components indicated by Cb and Cr. The luminance (or luma) component Y represents the brightness or grey level intensity (e.g. like in a grey-scale picture), while the two chrominance (or chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in a red, green, and blue (RGB) format may be converted or transformed into YCbCr format and vice versa, the process is also known as color transformation or conversion. If a picture is monochrome, the picture may comprise only a luminance sample array.

The picture source 312 may be, for example a camera for capturing a picture, a memory, e.g. a picture memory, comprising or storing a previously captured or generated picture, and/or any kind of interface (internal or external) to obtain or receive a picture. The camera may be, for example, a local or integrated camera integrated in the source device, the memory may be a local or integrated memory, e.g. integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g. a wired or wireless interface, an optical interface, according to any proprietary or standardized interface protocol. The interface for obtaining the picture data 312 may be the same interface as or a part of the communication interface 318.

In distinction to the pre-processing unit 314 and the processing performed by the pre-processing unit 314, the picture or picture data 313 may also be referred to as raw picture or raw picture data 313.

Pre-processing unit 314 is configured to receive the (raw) picture data 313 and to perform pre-processing on the picture data 313 to obtain a pre-processed picture 315 or pre-processed picture data 315. Pre-processing performed by the pre-processing unit 314 may, e.g., comprise trimming, color format conversion (e.g. from RGB to YCbCr), color correction, or de-noising.

The encoder 100 is configured to receive the pre-processed picture data 315 and provide encoded picture data 171 (further details will be described, e.g., based on FIG. 1).

Communication interface 318 of the source device 310 may be configured to receive the encoded picture data 171 and to directly transmit it to another device, e.g. the destination device 320 or any other device, for storage or direct reconstruction, or to process the encoded picture data 171 for respectively before storing the encoded data 330 and/or transmitting the encoded data 330 to another device, e.g. the destination device 320 or any other device for decoding or storing.

The destination device 320 comprises a decoder 200 or decoding unit 200, and may additionally, i.e. optionally, comprise a communication interface or communication unit 322, a post-processing unit 326 and a display device 328.

The communication interface 322 of the destination device 320 is configured receive the encoded picture data 171 or the encoded data 330, e.g. directly from the source device 310 or from any other source, e.g. a memory, e.g. an encoded picture data memory.

The communication interface 318 and the communication interface 322 may be configured to transmit respectively receive the encoded picture data 171 or encoded data 330 via a direct communication link between the source device 310 and the destination device 320, e.g. a direct wired or wireless connection, or via any kind of network, e.g. a wired or wireless network or any combination thereof, or any kind of private and public network, or any kind of combination thereof.

The communication interface 318 may be, e.g. configured to package the encoded picture data 171 into an appropriate format, e.g. packets, for transmission over a communication link or communication network, and may further comprise data loss protection and data loss recovery.

The communication interface 322, forming the counterpart of the communication interface 318, may be, e.g. configured to de-package the encoded data 330 to obtain the encoded picture data 171 and may further be configured to perform data loss protection and data loss recovery, e.g. comprising error concealment.

Both, communication interface 318 and communication interface 322 may be configured as unidirectional communication interfaces as indicated by the arrow for the encoded picture data 330 in FIG. 3 pointing from the source device 310 to the destination device 320, or bi-directional communication interfaces, and may be configured, e.g. to send and receive messages, e.g. to set up a connection, to acknowledge and/or re-send lost or delayed data including picture data, and exchange any other information related to the communication link and/or data transmission, e.g. encoded picture data transmission.

The decoder 200 is configured to receive the encoded picture data 171 and provide decoded picture data 231 or a decoded picture 231 (further details will be described, e.g., based on FIG. 2).

The post-processor 326 of destination device 320 is configured to post-process the decoded picture data 231, e.g. the decoded picture 231, to obtain post-processed picture data 327, e.g. a post-processed picture 327. The post-processing performed by the post-processing unit 326 may comprise, e.g. color format conversion (e.g. from YCbCr to RGB), color correction, trimming, or re-sampling, or any other processing, e.g. for preparing the decoded picture data 231 for display, e.g. by display device 328.

The display device 328 of the destination device 320 is configured to receive the post-processed picture data 327 for displaying the picture, e.g. to a user or viewer. The display device 328 may be or comprise any kind of display for representing the reconstructed picture, e.g. an integrated or external display or monitor. The displays may, e.g. comprise cathode-ray tubes (CRTs), liquid-crystal displays (LCDs), plasma displays, organic light-emitting diodes (OLEDs) displays or any kind of other display, such as beamer, hologram (3D), or the like.

Although FIG. 3 depicts the source device 310 and the destination device 320 as separate devices, embodiments of devices may also comprise both or both functionalities, the source device 310 or corresponding functionality and the destination device 320 or corresponding functionality. In such embodiments the source device 310 or corresponding functionality and the destination device 320 or corresponding functionality may be implemented using the same hardware and/or software or by separate hardware and/or software or any combination thereof.

As will be apparent for the skilled person based on the description, the existence and (exact) split of functionalities of the different units or functionalities within the source device 310 and/or destination device 320 as shown in FIG. 3 may vary depending on the actual device and application.

Therefore, the source device 310 and the destination device 320 as shown in FIG. 3 are just example embodiments and embodiments are not limited to those shown in FIG. 3.

Source device 310 and destination device 320 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices, broadcast receiver device, or the like and may use no or any kind of operating system.

Encoder and Encoding Method

FIG. 1 shows a schematic/conceptual block diagram of an embodiment of an encoder 100, e.g. a picture encoder 100, which comprises an input 102, a residual calculation unit 104, a transformation unit 106, a quantization unit 108, an inverse quantization unit 110, and inverse transformation unit 112, a reconstruction unit 114, a buffer 118, a loop filter 120, a decoded picture buffer (DPB) 130, a prediction unit 160, an inter estimation unit 142, an inter prediction unit 144, an intra-estimation unit 152, an intra-prediction unit 154, a mode selection unit 162, an entropy encoding unit 170, and an output 172. A video encoder 100 as shown in FIG. 1 may also be referred to as hybrid video encoder or a video encoder according to a hybrid video codec.

Figure 2:
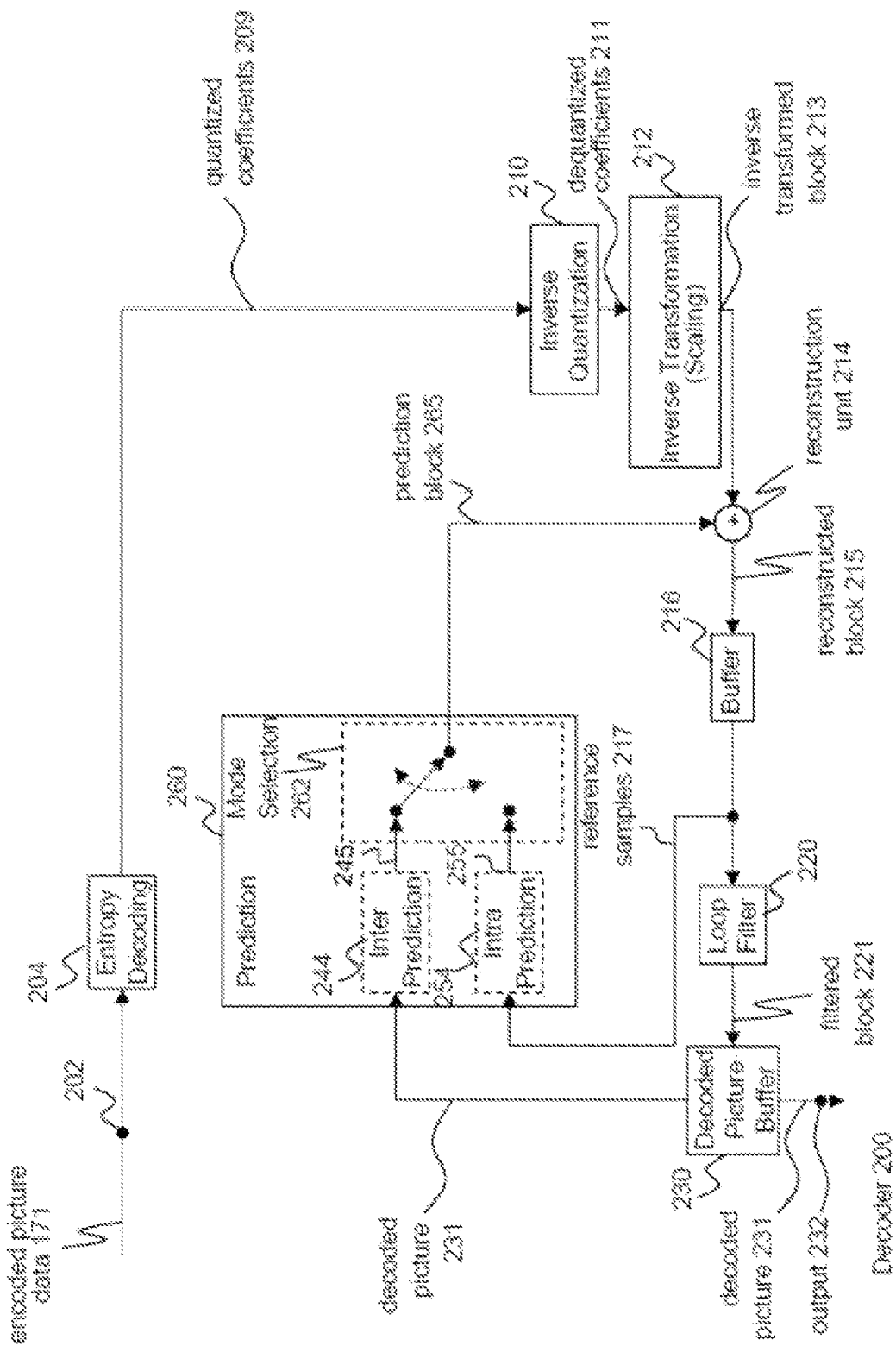
FIG. 2 is a block diagram showing an example structure of a video decoder configured to implement embodiments of the disclosure.

For example, the residual calculation unit 104, the transformation unit 106, the quantization unit 108, and the entropy encoding unit 170 form a forward signal path of the encoder 100, whereas, for example, the inverse quantization unit 110, the inverse transformation unit 112, the reconstruction unit 114, the buffer 118, the loop filter 120, the DPB 130, the inter prediction unit 144, and the intra-prediction unit 154 form a backward signal path of the encoder, wherein the backward signal path of the encoder corresponds to the signal path of the decoder (see decoder 200 in FIG. 2).

The encoder is configured to receive, e.g. by input 102, a picture 101 or a picture block 103 of the picture 101, e.g. picture of a sequence of pictures forming a video or video sequence. The picture block 103 may also be referred to as current picture block or picture block to be coded, and the picture 101 as current picture or picture to be coded (in particular in video coding to distinguish the current picture from other pictures, e.g. previously encoded and/or decoded pictures of the same video sequence, i.e. the video sequence which also comprises the current picture).

Partitioning

Embodiments of the encoder 100 may comprise a partitioning unit (not depicted in FIG. 1), e.g. which may also be referred to as picture partitioning unit configured to partition the picture 103 into a plurality of blocks, e.g. blocks like block 103, typically into a plurality of non-overlapping blocks. The partitioning unit may be configured to use the same block size for all pictures of a video sequence and the corresponding grid defining the block size, or to change the block size between pictures or subsets or groups of pictures, and partition each picture into the corresponding blocks.

For example, in HEVC, the picture is subdivided into so-called coding tree units, CTUs. CTUs have the same size, which may be determined by some signaling parameters or fixed by standard. CTUs typically do not overlap. Each CTU may then be further split into coding and/or transform units, i.e. blocks for which prediction and/or transformation is performed, respectively. The splitting is performed recursively by providing possibility to divide each block further in four further blocks (quad-tree partitioning) or two further blocks (binary-tree partitioning) or any other kind of partitioning. The decision on whether a CTU is split and into which depth for each of the CTU's blocks may be taken by rate-distortion optimization. However, in general, the splitting may also be defined based on other criteria, such as presence of edges in the CTU, or the like. Accordingly, in the present disclosure, when referring to "block" or "unit" as a part of the image, CTU or any units obtained by CTU splitting—square or rectangular without being square—are meant. In general, embodiments are possible, in which the block may overlap.

Like the picture 101, the block 103 again is or can be regarded as a two-dimensional array or matrix of samples with intensity values (sample values), although of smaller dimension than the picture 101. That is, the block 103 may comprise, e.g., one sample array (e.g. a luma array in case of a monochrome picture 101) or three sample arrays (e.g. a luma and two chroma arrays in case of a color picture 101) or any other number and/or kind of arrays depending on the color format applied. The number of samples in horizontal and vertical direction (or axis) of the block 103 define the size of block 103.

Encoder 100 as shown in FIG. 1 is configured encode the picture 101 block by block, e.g. the encoding and prediction is performed per block 103.

Residual Calculation

The residual calculation unit 104 is configured to calculate a residual block 105 based on the picture block 103 and a prediction block 165 (further details about the prediction block 165 are provided later), e.g. by subtracting sample values of the prediction block 165 from sample values of the picture block 103, sample by sample (pixel by pixel) to obtain the residual block 105 in the sample domain. Residual values (forming residual signal) correspond to prediction error (prediction error signal).

Transformation

The transformation unit 106 is configured to apply a transformation, e.g. a spatial frequency transform or a linear spatial (frequency) transform, e.g. a discrete cosine transform (DCT) or discrete sine transform (DST), on the sample values of the residual block 105 to obtain transformed coefficients 107 in a transform domain. The transformed coefficients 107 may also be referred to as transformed residual coefficients and represent the residual block 105 in the transform domain.

The transformation unit 106 may be configured to apply integer approximations of DCT/DST, such as the core transforms specified for HEVC/H.265. Compared to an orthonormal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operation, bit depth of the transformed coefficients, tradeoff between accuracy and implementation costs, etc. Specific scaling factors are, for example, specified for the inverse transform, e.g. by inverse transformation unit 212, at a decoder 200 (and the corresponding inverse transform, e.g. by inverse transformation unit 112 at an encoder 100) and corresponding scaling factors for the forward transform, e.g. by transformation unit 106, at an encoder 100 may be specified accordingly.

Quantization

The quantization unit 108 is configured to quantize the transformed coefficients 107 to obtain quantized coefficients 109, e.g. by applying scalar quantization or vector quantization. The quantized coefficients 109 may also be referred to as quantized residual coefficients 109. For example, for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a QP. The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and corresponding or inverse dequantization, e.g. by inverse quantization 110, may include multiplication by the quantization step size. Embodiments according to HEVC, may be configured to use a quantization parameter to determine the quantization step size. Generally, the quantization step size may be calculated based on a quantization parameter using a fixed-point approximation of an equation including division. Additional scaling factors may be introduced for quantization and dequantization to restore the norm of the residual block, which might get modified because of the scaling used in the fixed-point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the encoder 100 (or the quantization unit 108) may be configured to output the quantization scheme and quantization step size, e.g. by means of the corresponding quantization parameter such that a decoder 200 may receive and apply the corresponding inverse quantization. Embodiments of the encoder 100 (or quantization unit 108) may be configured to output the quantization scheme and quantization step size, e.g. directly or entropy encoded via the entropy encoding unit 170 or any other entropy coding unit.

The inverse quantization unit 110 is configured to apply the inverse quantization of the quantization unit 108 on the quantized coefficients to obtain dequantized coefficients 111, e.g. by applying the inverse of the quantization scheme applied by the quantization unit 108 based on or using the same quantization step size as the quantization unit 108. The dequantized coefficients 111 may also be referred to as dequantized residual coefficients 111 and correspond—although typically not identical to the transformed coefficients due to the loss by quantization—to the transformed coefficients 108.

The inverse transformation unit 112 is configured to apply the inverse transformation of the transformation applied by the transformation unit 106, e.g. an inverse DCT or inverse DST, to obtain an inverse transformed block 113 in the sample domain. The inverse transformed block 113 may also be referred to as inverse transformed dequantized block 113 or inverse transformed residual block 113.

The reconstruction unit 114 is configured to combine the inverse transformed block 113 and the prediction block 165 to obtain a reconstructed block 115 in the sample domain, e.g. by sample wise adding the sample values of the decoded residual block 113 and the sample values of the prediction block 165.

The buffer unit 116 (or short "buffer" 116), e.g. a line buffer 116, is configured to buffer or store the reconstructed block and the respective sample values, for example for intra estimation and/or intra prediction. In further embodiments, the encoder may be configured to use unfiltered reconstructed blocks and/or the respective sample values stored in buffer unit 116 for any kind of estimation and/or prediction.

Embodiments of the encoder 100 may be configured such that, e.g. the buffer unit 116 is not only used for storing the reconstructed blocks 115 for intra estimation 152 and/or intra prediction 154 but also for the loop filter unit 120 (not shown in FIG. 1), and/or such that, e.g. the buffer unit 116 and the decoded picture buffer unit 130 form one buffer. Further embodiments may be configured to use filtered blocks 121 and/or blocks or samples from the decoded picture buffer 130 (both not shown in FIG. 1) as input or basis for intra estimation 152 and/or intra prediction 154.

The loop filter unit 120 (or short "loop filter" 120), is configured to filter the reconstructed block 115 to obtain a filtered block 121, e.g. by applying a de-blocking filter, sample-adaptive offset (SAO) filter or other filters, e.g. sharpening or smoothing filters or collaborative filters. The filtered block 121 may also be referred to as filtered reconstructed block 121.

Embodiments of the loop filter unit 120 may comprise (not shown in FIG. 1) a filter analysis unit and the actual filter unit, wherein the filter analysis unit is configured to determine loop filter parameters for the actual filter. The filter analysis unit may be configured to apply fixed predetermined filter parameters to the actual loop filter, adaptively select filter parameters from a set of predetermined filter parameters or adaptively calculate filter parameters for the actual loop filter as will be discussed in detail below.

Embodiments of the loop filter unit 120 may comprise (not shown in FIG. 1) one or a plurality of filters, e.g. one or more of different kinds or types of filters, e.g. connected in series or in parallel or in any combination thereof, wherein each of the filters may comprise individually or jointly with other filters of the plurality of filters a filter analysis unit to determine the respective loop filter parameters, e.g. as described in the previous paragraph.

Embodiments of the encoder 100 (respectively loop filter unit 120) may be configured to output the loop filter parameters, e.g. directly or entropy encoded via the entropy encoding unit 170 or any other entropy coding unit such that, e.g., a decoder 200 may receive and apply the same loop filter parameters for decoding.

The DPB 130 is configured to receive and store the filtered block 121. The decoded picture buffer 130 may be further configured to store other previously filtered blocks, e.g. previously reconstructed and filtered blocks 121, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter estimation and/or inter prediction.

Further embodiments may also be configured to use the previously filtered blocks and corresponding filtered sample values of the decoded picture buffer 130 for any kind of estimation or prediction, e.g. intra and inter estimation and prediction.

The prediction unit 160, also referred to as block prediction unit 160, is configured to receive or obtain the picture block 103 (current picture block 103 of the current picture 101) and decoded or at least reconstructed picture data, e.g. reference samples of the same (current) picture from buffer 116 and/or decoded picture data 231 from one or a plurality of previously decoded pictures from decoded picture buffer 130, and to process such data for prediction, i.e. to provide a prediction block 165, which may be an inter-predicted block 145 or an intra-predicted block 155.

Mode selection unit 162 may be configured to select a prediction mode (e.g. an intra or inter prediction mode) and/or a corresponding prediction block 145 or 155 to be used as prediction block 165 for the calculation of the residual block 105 and for the reconstruction of the reconstructed block 115.

Embodiments of the mode selection unit 162 may be configured to select the prediction mode (e.g. from those supported by prediction unit 160), which provides the best match or that is the minimum residual (minimum residual means better compression for transmission or storage), or a minimum signaling overhead (minimum signaling overhead means better compression for transmission or storage), or which considers or balances both. The mode selection unit 162 may be configured to determine the prediction mode based on rate distortion optimization (RDO), i.e. select the prediction mode which provides a minimum rate distortion optimization or which associated rate distortion at least a fulfills a prediction mode selection criterion.

In the following the prediction processing (e.g. prediction unit 160 and mode selection (e.g. by mode selection unit 162) performed by an example encoder 100 will be explained in more detail.

As described above, encoder 100 is configured to determine or select the best or an optimum prediction mode from a set of (pre-determined) prediction modes. The set of prediction modes may comprise, e.g., intra-prediction modes and/or inter-prediction modes.

The set of intra-prediction modes may comprise 32 different intra-prediction modes, e.g. non-directional modes like DC (or mean) mode and planar mode, or directional modes, e.g. as defined in H.264, or may comprise 65 different intra-prediction modes, e.g. non-directional modes like DC (or mean) mode and planar mode, or directional modes, e.g. as defined in H.265.

The set of (or possible) inter-prediction modes depend on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The prediction unit 160 may be further configured to partition the block 103 into smaller block partitions or sub-blocks, e.g. iteratively using quad-tree-partitioning (QT), binary partitioning (BT) or triple-tree-partitioning (TT) or any combination thereof, and to perform, e.g. the prediction for each of the block partitions or sub-blocks, wherein the mode selection comprises the selection of the tree-structure of the partitioned block 103 and the prediction modes applied to each of the block partitions or sub-blocks.

The inter estimation unit 142, also referred to as inter picture estimation unit 142, is configured to receive or obtain the picture block 103 (current picture block 103 of the current picture 101) and a decoded picture 231, or at least one or a plurality of previously reconstructed blocks, e.g. reconstructed blocks of one or a plurality of other/different previously decoded pictures 231, for inter estimation (or "inter picture estimation"). E.g. a video sequence may comprise the current picture and the previously decoded pictures 231, or that is, the current picture and the previously decoded pictures 231 may be part of or form a sequence of pictures forming a video sequence.

The encoder 100 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter estimation parameters 143 to the inter prediction unit 144. This offset is also called MV. The inter estimation is also referred to as motion estimation (ME) and the inter prediction also motion prediction (MP).

The inter prediction unit 144 is configured to obtain, e.g. receive, an inter prediction parameter 143 and to perform inter prediction based on or using the inter prediction parameter 143 to obtain an inter prediction block 145.

Although FIG. 1 shows two distinct units (or steps) for the inter-coding, namely inter estimation 142 and inter prediction 152, both functionalities may be performed as one (inter estimation requires/comprises calculating an/the inter prediction block, i.e. the or a "kind of" inter prediction 154), e.g. by testing all possible or a predetermined subset of possible inter-prediction modes iteratively while storing the currently best inter prediction mode and respective inter prediction block, and using the currently best inter prediction mode and respective inter prediction block as the (final) inter prediction parameter 143 and inter prediction block 145 without performing another time the inter prediction 144.

The intra estimation unit 152 is configured to obtain, e.g. receive, the picture block 103 (current picture block) and one or a plurality of previously reconstructed blocks, e.g. reconstructed neighbor blocks, of the same picture for intra estimation. The encoder 100 may, e.g., be configured to select an intra prediction mode from a plurality of intra prediction modes and provide it as intra estimation parameter 153 to the intra prediction unit 154.

Embodiments of the encoder 100 may be configured to select the intra-prediction mode based on an optimization criterion, e.g. minimum residual (e.g. the intra-prediction mode providing the prediction block 155 most similar to the current picture block 103) or minimum rate distortion.

The intra prediction unit 154 is configured to determine based on the intra prediction parameter 153, e.g. the selected intra prediction mode 153, the intra prediction block 155.

Although FIG. 1 shows two distinct units (or steps) for the intra-coding, namely intra estimation 152 and intra prediction 154, both functionalities may be performed as one (intra estimation comprises calculating the intra prediction block, i.e. the or a "kind of" intra prediction 154), e.g. by testing all possible or a predetermined subset of possible intra-prediction modes iteratively while storing the currently best intra prediction mode and respective intra prediction block, and using the currently best intra prediction mode and respective intra prediction block as the (final) intra prediction parameter 153 and intra prediction block 155 without performing another time the intra prediction 154.

The entropy encoding unit 170 is configured to apply an entropy encoding algorithm or scheme (e.g. a variable length coding (VLC) scheme, a context-adaptive VLC scheme (CALVC), an arithmetic coding scheme, a context-adaptive binary arithmetic coding (CABAC)) on the quantized residual coefficients 109, inter prediction parameters 143, intra prediction parameter 153, and/or loop filter parameters, individually or jointly (or not at all) to obtain encoded picture data 171 which can be output by the output 172, e.g. in the form of an encoded bitstream 171.

FIG. 2 shows an exemplary video decoder 200 configured to receive encoded picture data (e.g. encoded bitstream) 171, e.g. encoded by encoder 100, to obtain a decoded picture 231.

The decoder 200 comprises an input 202, an entropy decoding unit 204, an inverse quantization unit 210, an inverse transformation unit 212, a reconstruction unit 214, a buffer 216, a loop filter 220, a decoded picture buffer 230, a prediction unit 260, an inter prediction unit 244, an intra prediction unit 254, a mode selection unit 260 and an output 232.

The entropy decoding unit 204 is configured to perform entropy decoding to the encoded picture data 171 to obtain, e.g., quantized coefficients 209 and/or decoded coding parameters (not shown in FIG. 2), e.g. (decoded) any or all of inter prediction parameters 143, intra prediction parameter 153, and/or loop filter parameters.

In embodiments of the decoder 200, the inverse quantization unit 210, the inverse transformation unit 212, the reconstruction unit 214, the buffer 216, the loop filter 220, the decoded picture buffer 230, the prediction unit 260 and the mode selection unit 260 are configured to perform the inverse processing of the encoder 100 (and the respective functional units) to decode the encoded picture data 171.

In particular, the inverse quantization unit 210 may be identical in function to the inverse quantization unit 110, the inverse transformation unit 212 may be identical in function to the inverse transformation unit 112, the reconstruction unit 214 may be identical in function reconstruction unit 114, the buffer 216 may be identical in function to the buffer 116, the loop filter 220 may be identical in function to the loop filter 120 (with regard to the actual loop filter as the loop filter 220 typically does not comprise a filter analysis unit to determine the filter parameters based on the original image 101 or block 103 but receives (explicitly or implicitly) or obtains the filter parameters used for encoding, e.g. from entropy decoding unit 204), and the decoded picture buffer 230 may be identical in function to the decoded picture buffer 130.

The prediction unit 260 may comprise an inter prediction unit 244 and an inter prediction unit 254, wherein the inter prediction unit 144 may be identical in function to the inter prediction unit 144, and the inter prediction unit 154 may be identical in function to the intra prediction unit 154. The prediction unit 260 and the mode selection unit 262 are typically configured to perform the block prediction and/or obtain the predicted block 265 from the encoded data 171 only (without any further information about the original image 101) and to receive or obtain (explicitly or implicitly)

the prediction parameters 143 or 153 and/or the information about the selected prediction mode, e.g. from the entropy decoding unit 204.

The decoder 200 is configured to output the decoded picture 230, e.g. via output 232, for presentation or viewing to a user.

Figure 4:
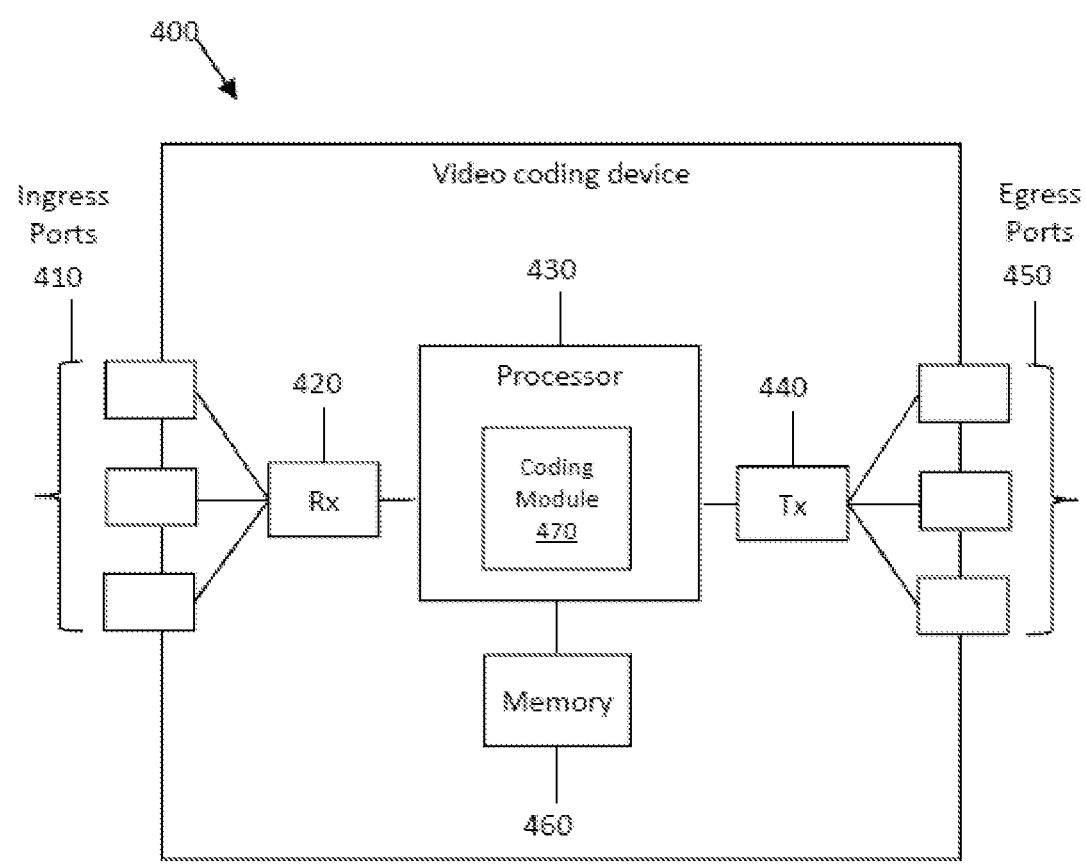
FIG. 4 is a block diagram of a video coder (encoder or decoder) with its interfaces.

FIG. 4 is a schematic diagram of a video coding device 400 according to an embodiment of the disclosure. The video coding device 400 is suitable for implementing the disclosed embodiments as described herein for example as an encoder or decoder. The video coding device 400 comprises ingress ports 410 and receiver units (Rx) 420 for receiving data, a processor, logic unit, or central processing unit (CPU) 430 to process the data, transmitter units (Tx) 440 and egress ports 450 for transmitting the data, and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals. The video coding device 400 may also include wireless transmitters and/or receivers in some examples.

The processor 430 is implemented by hardware and software. The processor 430 may be implemented as one or more CPU chips, cores (e.g., as a multi-core processor), field-programmable gate arrays (FPGAs), application-specific integrated circuits (ASICs), and digital signal processors (DSPs). The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 comprises one or more disks, tape drives, and solid-state drives and may be used as an overflow data storage device, to store programs when such programs are selected for execution, and to store instructions and data that are read during program execution. The memory 460 may be volatile and/or non-volatile and may be read-only memory (ROM), random-access memory (RAM), ternary content-addressable memory (TCAM), and/or static RAM (SRAM).

Note that this specification provides explanations for pictures (frames), but fields substitute as pictures in the case of an interlace picture signal.

Although embodiments have been primarily described based on video coding, it should be noted that embodiments of the encoder 100 and decoder 200 (and correspondingly the system 300) may also be configured for still picture processing or coding, i.e. the processing or coding of an individual picture independent of any preceding or consecutive picture as in video coding. In general, only inter-estimation 142, inter-prediction 144, 242 are not available in case the picture processing coding is limited to a single picture 101. Most if not all other functionalities (also referred to as tools or technologies) of the video encoder 100 and video decoder 200 may equally be used for still pictures, e.g. partitioning, transformation (scaling) 106, quantization 108, inverse quantization 110, inverse transformation 112, intra-estimation 142, intra-prediction 154, 254 and/or loop filtering 120, 220, and entropy coding 170 and entropy decoding 204.

The person skilled in the art will understand that the "blocks" ("units") of the various figures (method and apparatus) represent or describe functionalities of embodiments (rather than necessarily individual "units" in hardware or software) and thus describe equally functions or features of apparatus embodiments as well as method embodiments.

The terminology of "units" is merely used for illustrative purposes of the functionality of embodiments of the encoder/decoder and are not intended to limiting the disclosure.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, the functional units in the embodiments may be integrated into one processing unit, or each of the units may exist alone physically, or two or more units are integrated into one unit.

Embodiments may further comprise an apparatus, e.g. encoder and/or decoder, which comprises a processing circuitry configured to perform any of the methods and/or processes described herein.

Embodiments of the encoder 100 and/or decoder 200 may be implemented as hardware, firmware, software or any combination thereof. For example, the functionality of the encoder/encoding or decoder/decoding may be performed by a processing circuitry with or without firmware or software, e.g. a processor, a microcontroller, a DSP, an FPGA, an ASIC, or the like.

The functionality of the encoder 100 (and corresponding encoding method 100) and/or decoder 200 (and corresponding decoding method 200) may be implemented by program instructions stored on a computer readable medium. The program instructions, when executed, cause a processing circuitry, computer, processor or the like, to perform the steps of the encoding and/or decoding methods. The computer readable medium can be any medium, including non-transitory storage media, on which the program is stored such as a BLU-RAY DISC, DVD, compact disc (CD), Universal Serial Bus (USB) (flash) drive, hard disc, server storage available via a network, etc.

An embodiment comprises or is a computer program comprising program code for performing any of the methods described herein, when executed on a computer.

An embodiment comprises or is a non-transitory computer readable medium comprising a program code that, when executed by a processor, causes a computer system to perform any of the methods described herein.

Video encoding may be employed in cameras or systems with an input from one or more cameras or may run on a computer to encode/compress or transcode videos. One of the challenging applications of camera systems is surveillance and/or driver assistance.

Figure 5:
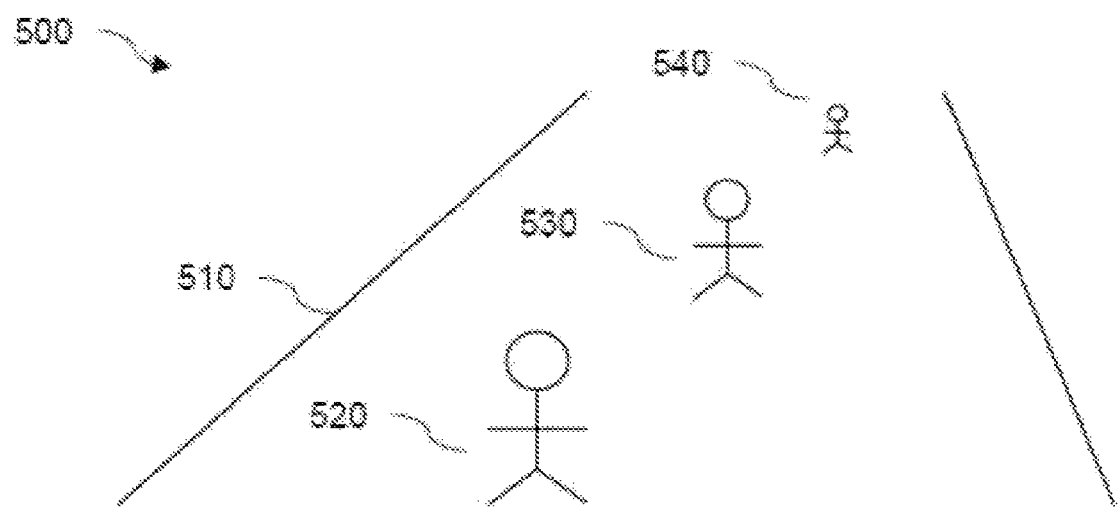
FIG. 5 is a schematic drawing illustrating the problem of detection of objects with different sizes.
Figure 6:
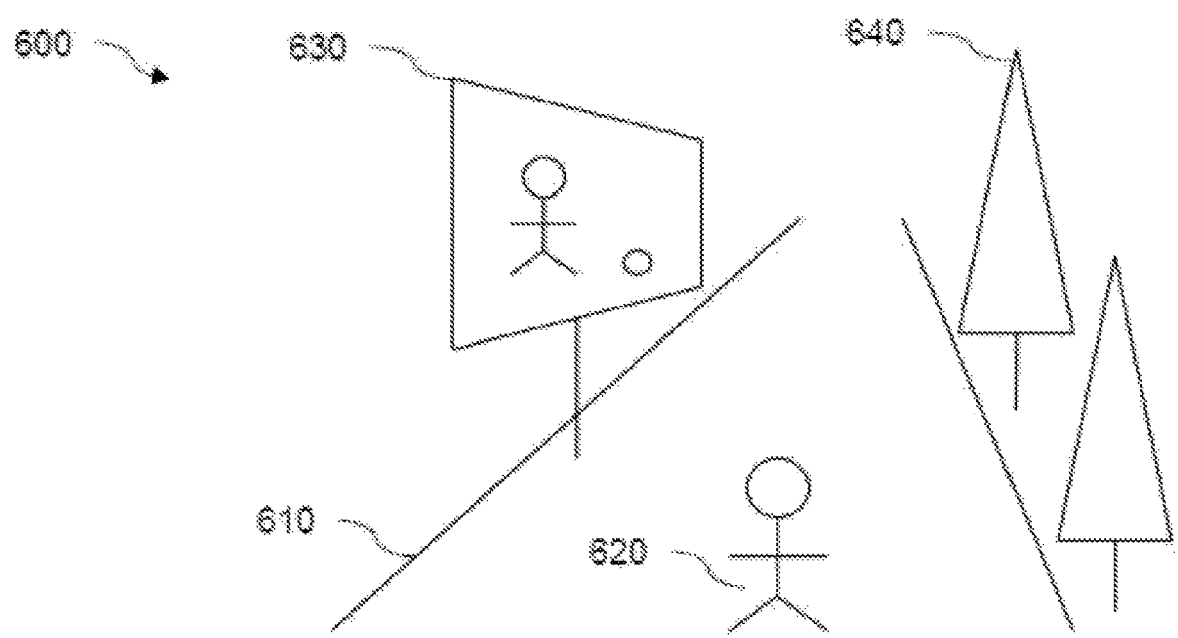
FIG. 6 is a schematic drawing illustrating the erroneous detection of non-interesting objects using motion but not texture.

One major task of a surveillance system is detection and tracking (and often also identification) of objects, including persons, motor vehicle or non-motor vehicles or the like, in a video image, respectively, in its frames apart from the usually unimportant image background. In general, before a more detailed object identification is performed, the video, respectively, its frames are segmented first into a foreground image and background image, wherein the foreground image contains in most cases image details to be processed further. Commonly, the segmentation is performed through classification of a pixel or a group of pixels of the video image, respectively, of a frame whether the pixel or the pixel group belongs to the foreground or background based on certain classification criteria. These criteria are specified beforehand. The following FIGS. 5 and 6 illustrate the problem of the erroneous classification of objects to belong to the uninteresting background or interesting foreground, when only a limited set of information is used. This results ultimately in an erroneous segmentation of the entire video image.

FIG. 5 shows three pedestrian persons 520 to 540 along a street 510 at different distances, resulting in different sizes. In view of the quite homogeneous texture of this exemplary image, a far distant pedestrian in particular may be difficult to be detected using image texture only. However, if motion information of the image, for example, based on motion vectors or optical flows, is additionally used, then even small objects may be detected even if the video image has a homogeneous texture. That is, the motion information is a strong feature by which a region in the video image may be identified as relevant, corresponding to an interesting region. Those regions may be also referred to as ROI, in which the motion of an object or multiple objects is equal to or larger than a predefined value, for example. The term motion refers, for example, to a velocity of an object within the video image, indicating the amount by which the object changes its location within the video image. Such velocity information for one or multiple objects may be obtained, for example, from the motion vectors and/or optical flows of the video image. In case, the video image is provided in terms of pixel units, such a velocity may be specified in units of pixel per second (pps). By predefining one or more thresholds for the velocity or related quantities, the strength of a motion of an object may be specified and corresponding apparatus and/or method tasks may be triggered. For example, the presence of an object itself within a video image or its frames may be decided upon whether the object motion exceeds a predefined threshold or not. In turn, regions in the video image, which are not of interest or of less interest, may be referred to as RONI, in which the motion of an object is not or less pronounced e.g. when the motion of the object is less than the predefined threshold.

FIG. 6 shows a similar scenario, where the texture of the image is now more complex, as it includes not only a pedestrian person 620 on the street 610, but also an LED advertisement display 630 with moving content and a group of trees 640, with the trees swinging slightly. In this scenario, the trees as a part of the image background were detected as those objects being part of the ROI, if motion information were used only. However, if the motion information is used in conjunction with texture (here the texture of trees), then the trees were (correctly) detected as being part of the RONI, since they belong to the, in general uninteresting, background.

Figure 7:
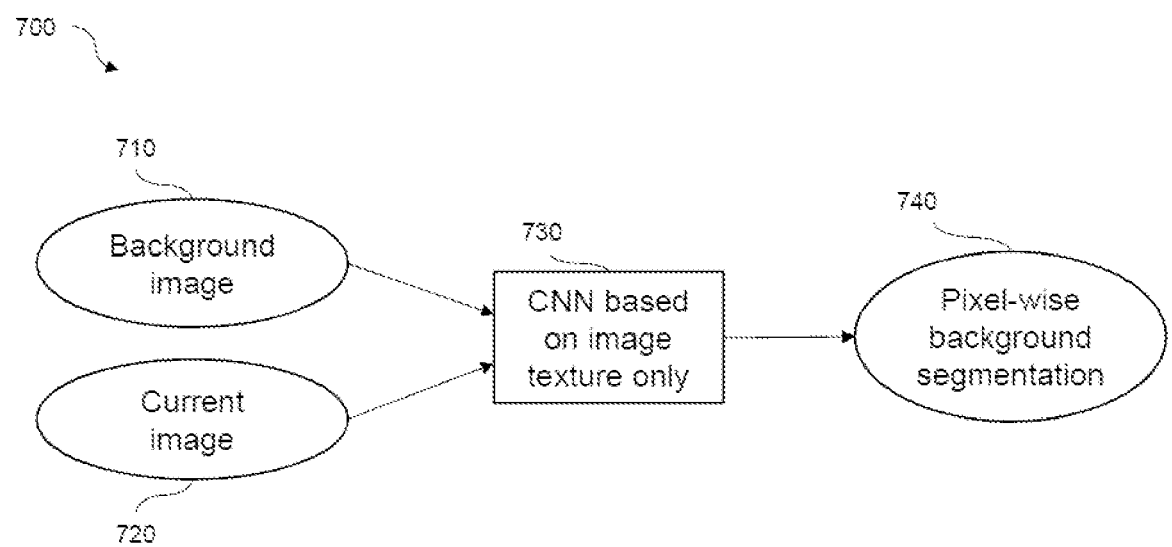
FIG. 7 is a block diagram of a pixel-wise background segmentation by a convolutional neural network (CNN) using texture only.

FIG. 7 illustrates the image segmentation into background and foreground according to the approach of M. Braham and M. Van Droogenback, "Deep background subtraction with scene-specific convolutional neural networks", 2016 Conference on Systems, Signals, and Image Processing (IWS-SIP), Bratislava, 2016, pp. 1 to 4. In their pixel-wise approach, a background image 710 is generated and maintained based on previous images. These images are then input to the CNN 730 for network training, using only texture to classify each pixel of a current image 720 whether or not the pixel belongs to the background 740 (i.e. RONI pixel) or to a (foreground) object (i.e. pixel belonging to a region of interest ROI). This approach has the disadvantage in case it is executed for classifying each pixel of the input image and thus suffers from a high computational complexity. Also, a background image 710 has to be generated and maintained explicitly. Moreover, no motion information, i.e. no motion statistics of possible interesting objects of differing size, is used, that may result in erroneous segmentation of a frame in ROI and RONI.

As disclosed in the following exemplary embodiments of the disclosure, the present disclosure exploits a machine-learning-based model, which is input with motion information and frames of a video image, for adapting one or multiple coding parameters used for encoding the video image.

According to an embodiment, an apparatus is provided wherein a video image, including a plurality of video frames, is encoded using coding parameters in order to provide a video bitstream as the output. The encoding may be one of the known compression standards, such as AVC, HEVC, JPEG2000, or the like. In the following, the terms "video", "video image", "video frame", or "frame" are used interchangeably.

Figure 8:
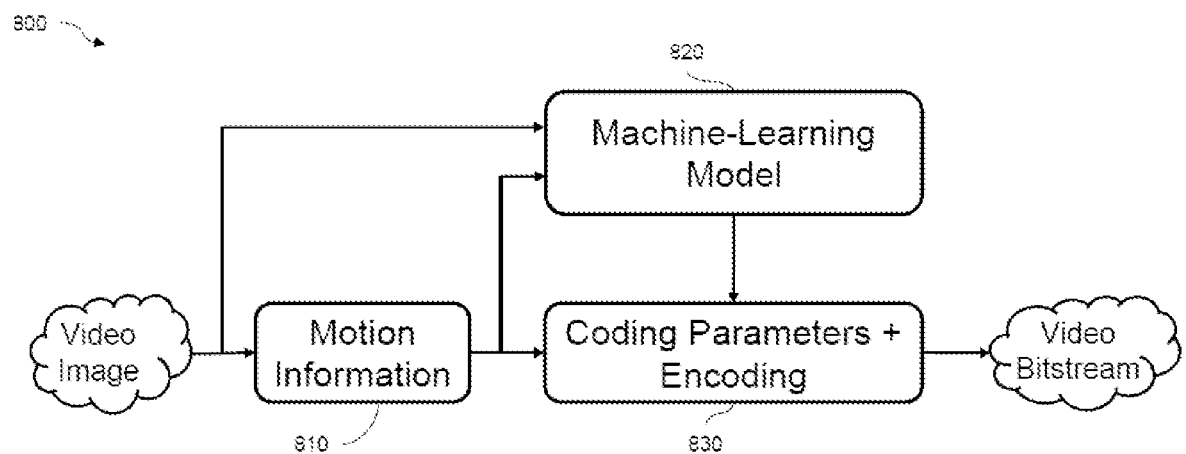
FIG. 8 is a block diagram of an embodiment, in which coding parameters are adapted according to an output of a machine-learning model using motion information.

FIG. 8 shows an exemplary embodiment, where a video image is encoded in module 830 to generate a video bitstream based on coding parameters. In the embodiment of FIG. 8, the coding parameters are also adapted within the module 830. The parameters are adapted based on the output of a machine-learning model 820 and of the motion information determined by module 810. The output of the machine-learning model 820 is determined based on the video image and the determined motion information, both of which are provided as input to the machine-learning model 820 during a training phase and/or during operation, depending on the type of the model. The video image may contain texture information, which is used by the machine-learning model 820 in conjunction with the motion information to perform foreground-background segmentation of the video image. The segmentation result of the machine-learning model 820 is output and provided as input to the module 830 to perform the coding parameter adaptation combined with the motion information. As further explained in the forthcoming embodiments, the image segmentation by machine-learning model is based on classification of the sample or the group of samples belonging to a ROI or a RONI.

The term texture information corresponds to texture of a sample or group of samples of a frame of the video image, which provides information about the spatial variation and/or arrangement of color (chroma) and/or intensity (luma) within the video image or a sample/pixel region of the video image. That is, the term "texture" is used herein to denote the samples of a video image in the spatial domain.

The frames of the video image are used to determine the motion information 810 for a sample of the video image. The sample may correspond to one sample or multiple samples of the video image, i.e. a sample of one or more luma and/or color (i.e. chroma) components. The sample may correspond to a pixel of a video frame. The motion information and the video image sample(s) to which the motion information relates are provided as an input to a machine-learning model 820, which may be subject to training or alternatively may be already trained.

The machine-learning-based model 820 may be any of a neural network (NN), a deep neural network (DNN), a CNN, a fully connected neural network (FCNN), a support vector machine (SVM), or any other learning-based model.

The motion information 810 and the output of the machine-learning model 820 are used as the input to the encoder 830. The machine-learning model 820 determines the input used for setting the coding parameters. In this illustrative embodiment, the encoder 830 determines the coding parameters by adapting them in accordance with its input, including the motion information and the output of the machine-learning-based model.

However, the embodiments are not limited to such an approach and, in general, the machine-learning model may be trained to directly deliver the coding parameters, which are then input to the encoder 830. The coding parameters may be determined for one sample or a group of samples of the video image. The coding parameters of different single samples or different groups of samples may thus be different.

The sample is encoded by applying the determined coding parameters. The encoding of a sample or the samples is performed by an encoder 430 and provides the encoded video image as a bitstream video. The encoding of the sample may include encoding of one sample or a group of samples. The encoder may encode one sample or a group of samples differently in accordance with the different coding parameters. The groups of samples may be for instance blocks. In present codecs, some coding parameters may be varied on a block basis, others per one or more pictures (video frames). Alternatively, the groups of samples may be determined by segmentation and/or block detection without block raster.

In the embodiment of FIG. 8, the processing circuitry of the apparatus is configured to perform both the adaptation of the coding parameters and the encoding. However, the coding parameter adaptation and the image encoding may be instead performed by different circuitries, arranged on the same or different chips. Alternatively, the coding parameter adaptation may be performed by the circuitry of the machine-learning model 820. That is, any of the tasks as discussed henceforth may be performed in a combined manner by a single circuitry or different circuitries. Parts of the tasks may also be combined in any suitable combination depending on the application.

In standard video encoders, the coding parameters, such as frame rate, spatial resolution, or compression strength are input to the encoder by a user, for example, by the application which uses the encoder and/or by a person employing the encoder. Some encoder implementations may, on the other hand, determine other coding parameters or even adapt the input coding parameters, based on rate-distortion optimization or rate-distortion-complexity optimization, or the like.

In the present disclosure, the coding parameters input to the encoder are (pre)determined automatically, based on the content characteristics, namely the texture (i.e. sample values) and the motion. This functionality is not necessarily a part of the encoder circuitry and may be implemented in a separate integrated circuit or other piece of software and/or hardware. However, the present disclosure is not limited to such implementation and the coding parameter determination may be implemented within the same hardware piece (integrated circuit (IC), processor or the like) as the encoder.

In turn, the encoder (circuitry) may generate motion vectors which may be used as motion information to be input to the machine-based learning model. However, it is noted that motion information of the present disclosure is not limited to motion vectors determined by the encoder. Alternatively, the motion vectors as input for the coding parameter determination may be determined separately from the encoder. Moreover, the motion information is not limited to motion vectors, but rather may be provided by optical flows. Other quantifying parameters may be used as well, such as the speed and/or direction of motion. Alternatively, or in addition, motion information may be determined based on, i.e. using the motion vectors and/or optical flow, as detailed in the following embodiments.

According to an embodiment shown in FIG. 9, the processing circuitry of the apparatus 900 (marked by the dashed box) is configured to perform the tasks of the machine-learning based model 910, the analysis of motion by a motion analyzer 930 based on the motion information, and the adaption of the coding parameters including frame rate adaptation 940, picture size adaptation 950, and generation of a QP map by a QP map generator 960 for QP adaptation.

The coding parameters picture size and quantization parameter QP refer to parameters of the spatial resolution. The frame rate refers to temporal resolution. The adaptation of picture size and frame rate is also denoted as ST adaptation. The coding parameters to be adapted for encoding the vie image are not limited to frame rate, picture size or quantization parameter. Other parameters used for encoding may include block splitting (how the video frame is segmented into blocks of possibly different size and/or shape), type of prediction or prediction mode, or the like.

Herein, the encoder, respectively, the circuitry is separate from the coding parameter adaptation, i.e. modules 940, 950, and 960. The encoder provides motion information, for example, in terms of motion vectors of the video image and performs encoding.

The motion information may not be limited to motion vectors. Alternatively, the motion information may be based on optical flow of the video image, which may be obtained by well-known approaches, including Lucas-Kanade, Horn-Schunck, Buxton-Buxton, Black-Jepson, or the like.

Separating the circuitry of the encoder, i.e. the encoder itself, from the other circuitries allows using a video encoder (e.g. H.264/AVC or HEVC (H.265), as described above with reference to FIGS. 1 and 2, in which case the encoder needs an interfacing with the external functional blocks of the other modules. These modules then perform the coding parameter adaptation based on the motion information and the output of the machine-learning model, and provide the adapted coding parameters to the encoder by signaling for example. From the above description it is clear that each of the functional blocks of the apparatus may have its own circuitry in general, implemented as hardware and/or software.

The embodiments utilize a machine-learning-based model for the adaptation of the coding parameters, with motion information and video image information being provided as input to the learning model. Such a learning model, including NN, DNN, CNN, FCNN, SVM or the like, requires their input to be in a suitable format for further processing.

In order to assure compatibility with standard video encoders, for example H.264/AVC or HEVC (H.265), the input data including motion information and video image have to be transformed format for being suitable as input to the machine-learning model.

In HEVC, the picture is subdivided into so-called coding tree units, CTUs. CTUs have the same size, which may be determined by some signaling parameters or fixed by standard. A CTU may be further split into CUs and/or transform units. That is, HEVC established CTU as a root for the tree-based hierarchical splitting, such as quad-tree splitting of CTUs and CUs to four square CUs until a maximum depth, corresponding to minimum size a CU is allowed to take.

How the motion information may be concatenated with the current CTU framework, is further detailed in the following embodiments shown in FIGS. 10A to 10C by example of a convolutional neural model (CNN).

Figure 10A:
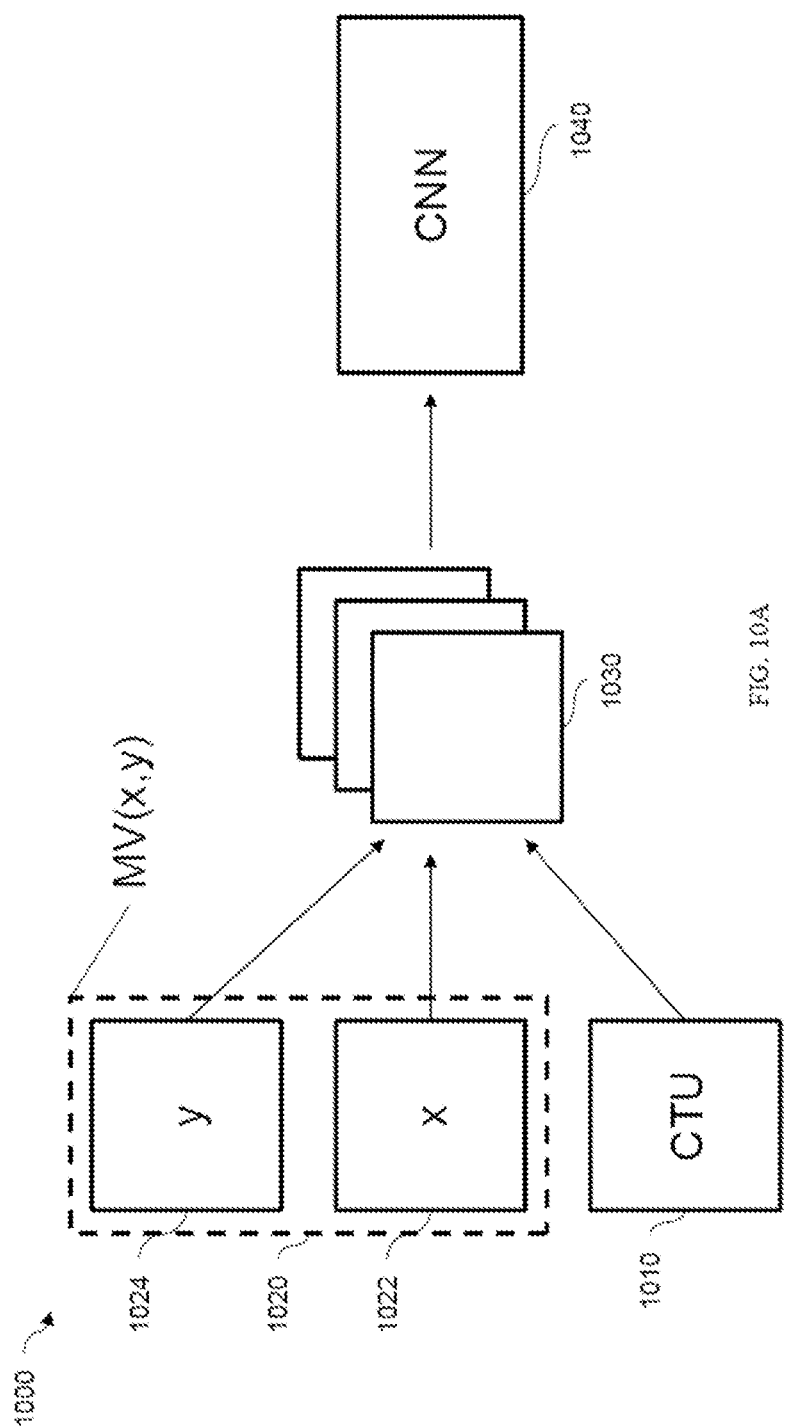
FIG. 10A is a schematic drawing of the data structure for merging image content CTU blocks with motion vector (MV) of the same size, input to the CNN for ROI-RONI classification.

The first exemplary embodiment of FIG. 10A shows how this is accomplished by a circuitry, which is configured to divide the video image into equally-sized coding-tree units CTUs 1010. The CTU is further hierarchically split into a plurality of coding units CUs. As mentioned, in H.264/AVC or HEVC (H.265), these CTUs/CUs are the basic block units, which are referred to as blocks. By default, the block size is 64×64 (in CTU unit) for high-definition (HD) videos, while 32×32 is also suitable. For 4 k-videos, the recommended block size is 128×128, while 64×64 is also used.

Next, motion information is determined for a sample of a block based on the motion vectors (MVs) of the block. In general, a block may include one sample or multiple samples. The term block refers to rectangular coding units, which may be but do not have to be square. The CTUs and the motion vectors are input to the machine-learning model in a suitable format.

The MVs are provided by the encoder as motion information. The encoder may provide a motion vector for each sample, corresponding to a sample/pixel-wise motion vector. Alternatively, the motion vector may be provided for each block, i.e. for each of the plurality of CUs or the CTU. This corresponds block-wise motion vectors.

A motion vector has a horizontal x and vertical y component, i.e. MV=MV(x,y). The coordinates typically denote a vector with a starting point in a position of a block co-located in a reference picture with a current block in the current frame (picture), for which the motion vector is determined. The end position is the shift of a most similar block to the current block (among a limited number of candidates in a search space), wherein the similarity is determined by a cost function, such as a sum of absolute differences.

In the embodiment of FIG. 10A, the motion vector matrix has the same size as the CTU. That is, there is a motion vector associated with each sample/pixel of the CTU.

The 2D motion vector matrix MV(x,y) 1020 is then split into its x and y (i.e. horizontal and vertical) components, MVx 1022 and MVy 1024, both of which have also the same size as the CTU. As a result, the 2D MV components MVx and MVy can then be concatenated with the CTU matrix (array) 1010 into one common 3D matrix. This concatenated 3D data 1030, including the three equal-sized 2D data matrices CTU 1010, MVx 1022, and MVy 1024, is then in a suitable format as input for the CNN 1040.

Figure 10B:
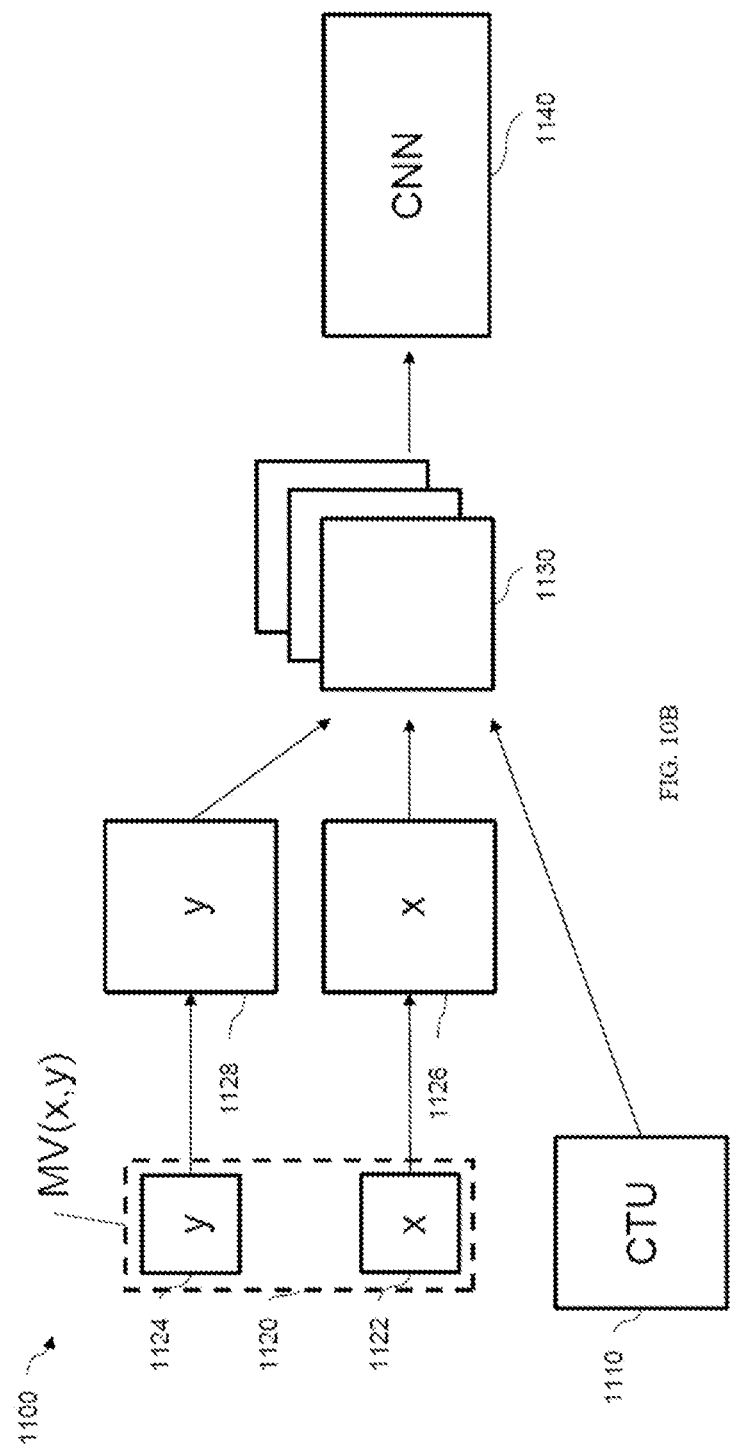
FIG. 10B is a schematic drawing of the data structure, similar to FIG. 10A, with the MV having the same size as the CTU after resizing the MV, and input to the CNN.

The second exemplary embodiment of FIG. 10B shows how to prepare the input of the machine-learning model, when the MVs are not pixel-wise, but block-wise. This means that the MVs, as provided by the encoder for example, are not determined for each sample (i.e. pixel) of the CTU, but rather for each of the (sub-)blocks (i.e. the coding units) of the CTU.

Since the number of the coding units of a CTU is less than the number of pixels of a CTU, the size of a block-wise MV(x,y) 1120 is typically smaller than the size of the CTU 1110. As a result, the components MVx 1122 and MVy 1124 of the block-wise motion vector 1120 are also smaller than the CTU 1110. This is illustrated in FIG. 10B. Because of the different sizes of the CTU and the MV, respectively, the components MVx 1122 and MVy 1124 need to be first resized to the same size as the CTU. These data, including the CTU 1110 and the resized components MVx 1126 and MVy 1128, are then concatenated to the 3D data 1130. The data 1130 is now in a suitable format and input to the CNN 1140.

Figure 10C:
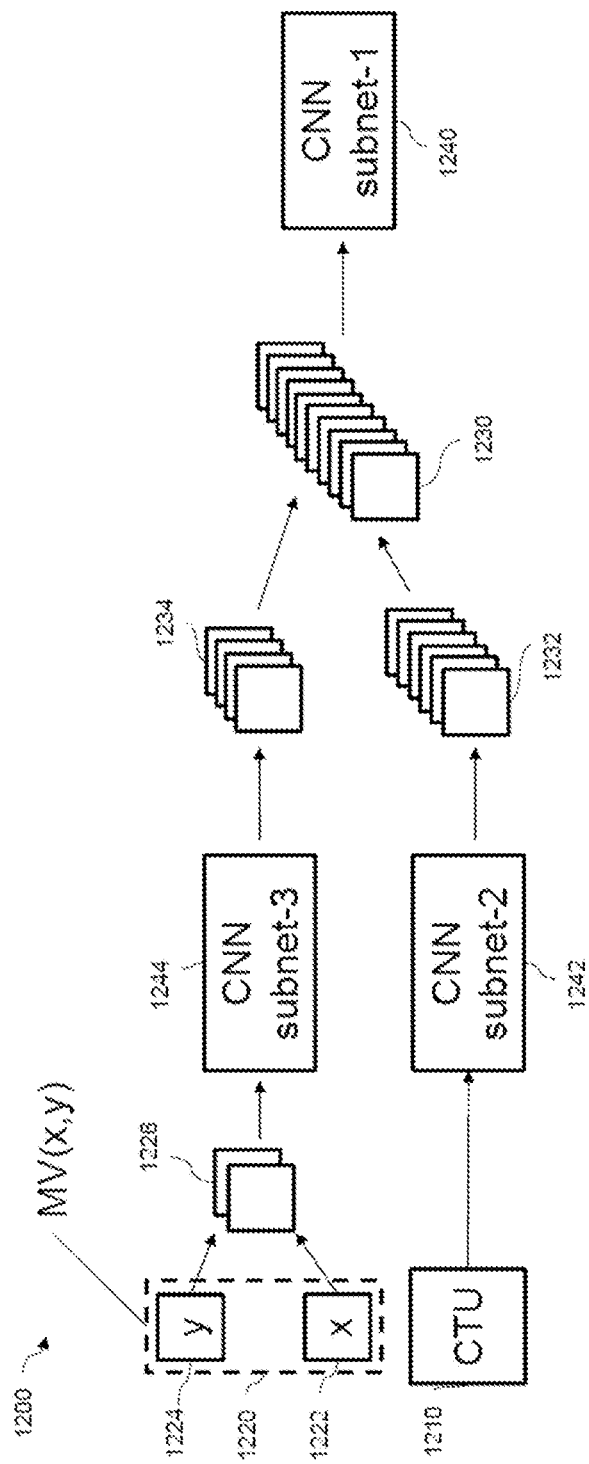
FIG. 10C is a schematic drawing of the data structure without MV resizing, but using additional subnets 2 and 3, which perform data processing such that their output has the same size for merging.

The third exemplary embodiment of FIG. 10C considers a similar case as in the second exemplary embodiment of FIG. 10B, namely with the MV 1220, respectively, its components MVx 1222 and MVy 1224 being smaller than the CTU 1210. The difference to the second embodiment is that now a first machine-learning model 1242 and a second machine-learning model 1244 are included as intermediate machine-learning models.

The CTU is input to the first subnet 1242. The concatenated data 1226 of the motion vector components MVx 1222 and MVy 1224 are input to the second subnet 1244. The second subnet 1244 is configured to process the input data 1226 such that the size of the output 1234 of subnet 1244 is the same as the output 1232 of subnet 1242. As a result, both sets of output data 1232 and 1234 may be concatenated to the multi-dimensional data 1230 into a suitable format for the CNN 140. The data 1230 is then input to the CNN 1240.

In general, all three networks 1240, 1242, and 1244 may be different. In the exemplary embodiment shown in FIG. 10C, the subnets 1242 and 1244 may perform pre-processing separately, before the pre-processed data 1232 and 1234 are fused (i.e. merged or concatenated) to the data 1230 and input to subnet 1240. In this example, the intermediate subnets 1242 and 1244 just provide intermediate results as output, without having a specific physical meaning. For example, the pre-processing may include filtering or the like of the input data.

Alternatively, intermediate subnets in particular may be configured such as to provide a physical output as result of pre-processed data. Since all subnets may be different, each of the subnets may be selected to perform a specific classification, for which the respective subnet is further designed for. For example, subnet 1244 which is pre-processing the motion vector may be a network that is optimized for classifying motion information. As a result, subnet 1244 may be, for example, very fast and accurate in classifying temporal changes in video images due to object motion. On the other hand, subnet 1242 which is pre-processing the CTU may be a network that is optimized for classifying (here CTU-based) images using texture (or similar image features). As a result, subnet 1242 may be, for example, very fast and accurate in classifying a CTU based on image features, which may be still image feature and/or dynamic image features. In turn, subnet 1240 may be a network that may be less specific than the subnets 1242 and 1244, as it uses the specific output data of subnets 1242 and 1244 as input to perform classification of the concatenated data. That is, subnet 1240 may be a network which is optimized to perform classification of mixed-type input data, comprising motion information and texture, for example. The embodiment of FIG. 10C is not limited to the one shown, and may include other network configurations, including different types of networks, different number of networks, and how they are connected with each other.

The above three embodiments of FIGS. 10A to 10C account for the current video standard, where CTUs (including their coding units) are used as the basic units of the video image being encoded. However, the embodiment is not restricted to CTU/CU-based data structures, but rather is applicable to any other data structure suitable for next-generation coding-encoding technology. For example, the standard CTU/CU of H.264/AVC or HEVC (H.265), which relies on frame segmentation according a hierarchical tree partitioning, may in part or entirely be replaced by other image segmentation techniques based on clustering and/or using a machine-learning based model, wherein the motion information may not necessarily be based on motion vectors and/or optical flows of one sample and/or a group of samples of a block.

With the data 1030, 1130, and/or 1230, formatted in the manner as described above with reference to FIGS. 10A to 10C, the machine-learning-based model 820 or 910 uses this data as input and performs classification of the input sample as to belonging to a region of interest ROI or a region of non-interest RONI. This ROI-RONI classification of a sample of a block results in an image segmentation of the video image, respectively, of its frames.

To perform the classification for an unknown sample and/or unknown group of samples of an unknown video, the model has been subjected to learning using known input data, obtained from known video images. Known video images means, for example, that image information of the video is known, including color intensity of a sample, texture, motion information, presence or absence of an object or multiple objects within the video, object type or the like are known and used for the training/learning of the model. Whether the sample or the samples of the block is classified as belonging to the ROI or RONI depends in particular on the motion information and texture of a sample of a block or of a block of samples.

According to an embodiment, the processing circuitry is configured to obtain as the output of the machine-learning-based model a map, which specifies the ROI and RONI of the video image. The map includes for each sample or block of samples an indication whether the said sample or block of samples belongs to the ROI or RONI.

The indication may be performed in various ways, wherein the map is a bitmap, for example. In this case, the map (also referred to as importance map) indicates on a one-bit level, whether the sample or the block of samples is a ROI or RONI by setting the 1-bit for ROI and 0-bit to RONI. That is, the map may include for each sample of the video image an indication (such as a single bit), which indicates whether the respective sample belongs to ROI or to RONI. Alternatively, the indication may include more bits and indicate to which cluster (object) the respective sample belongs.

In case of a CTU/CU-based data structure, the machine-learning model may classify the entire CTUs or CUs as a ROI or RONI rather than each sample separately. That is, the map may include an indication not for each sample of a video frame, but rather for each block (CU) of the video frame. The indication may be one or more bits. A one bit indication may take values "1" or "0", respectively for RONI or ROI. This ROI-RONI indication, based on the one-bit map, is just one example and not limited thereto.

Other Boolean-type indicators may be used, such as "True/False", "Yes/No", and the like.

Therefore, the simultaneous use of texture and motion information improves the ROI-RONI classification of the image samples (pixels). As a result, the foreground-background image segmentation becomes more accurate and reliable. The segmentation may be performed for a frame (image) of the video or only for some frames.

According to an embodiment, the machine-learning-based model is configured to detect an object within the video image. The model detects an object within the video image using both texture of a sample or a group of samples and motion information (e.g. motion vectors). The output of the machine-learning model includes the detection result whether or not an object or multiple objects is/are in the video image. This output is also used by the coding parameter adaptation modules to adapt a coding parameter in accordance with the presence of an object.

The object detection provides the advantage of providing a more detailed information about the video image than just the ROI-RONI classification for coding-parameter adaptation. This, however, may result in a higher system complexity as opposed to a system that uses ROI-RONI classification only.

The combined use of texture and motion information enables a more reliable and accurate detection in particular of small objects (e.g. at far distances), which may move slowly.

The described embodiments so far describe the output of the machine-learning-based model, including the ROI-RONI map as a bit-wise importance map and the object detection result. As shown in FIG. 9, the adaptation of the coding parameters, including frame rate, picture size and/or quantization parameter QP, depends not only on the output of the learning model, but also on the output of the motion analyzer 930 performing analysis of the motion described next.

In the embodiment corresponding to FIG. 9, the calculated motion determines only the adaptation of the frame rate. Alternatively, the motion may determine any of the other coding parameters related to spatial resolution and/or temporal resolution.

According to an embodiment, the processing circuitry is further configured to calculate motion for a sample based on a metric of the motion vector of a block in which the sample is located.

The metric of the motion vector may be the p-norm, with p being a positive integer equal to or larger than one. Other types of metric fulfilling the well-known metric conditions may be used as well. For example, motion may be calculated as a length of the vector, i.e. as a square root of the sum of the vector component squares (square norm, i.e. p=2) or merely a size of one or both motion vector components, or the like. It is noted that the motion vector components may be counted in units of quarter pixel (quarter pel), a displacement of a quarter pel, half pel, and one pel, corresponding to a size of one, two, and 4, respectively.

The term motion refers to a temporal change of the sample or a group of samples of a block, including changes of luma and/or color intensity within a video image and/or between different (e.g. adjacent) frames of a video. Determining such as change may not be restricted to motion vectors as motion information. Optical flow may be used alternatively or the like.

Figure 11A:
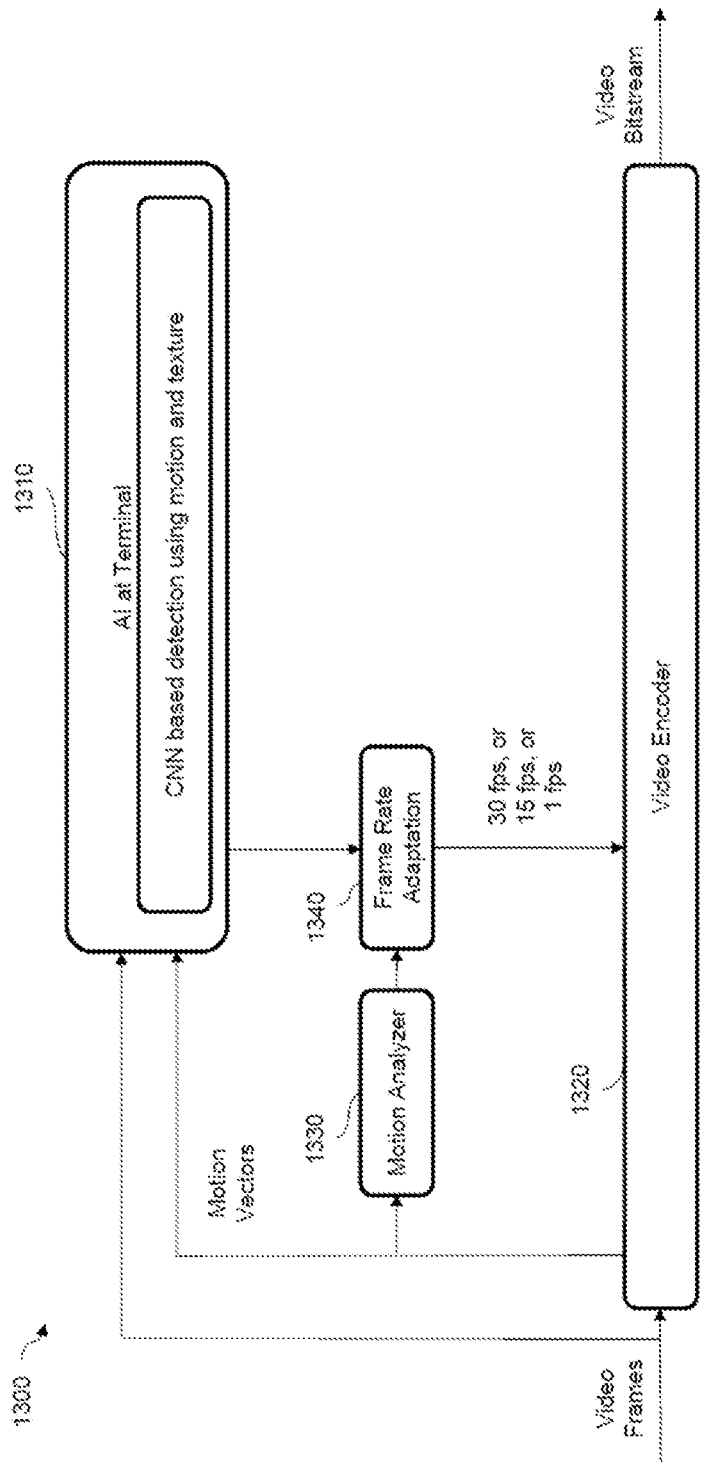
FIG. 11A is a block diagram with the motion analyzer module for frame rate adaptation.
Figure 11B:
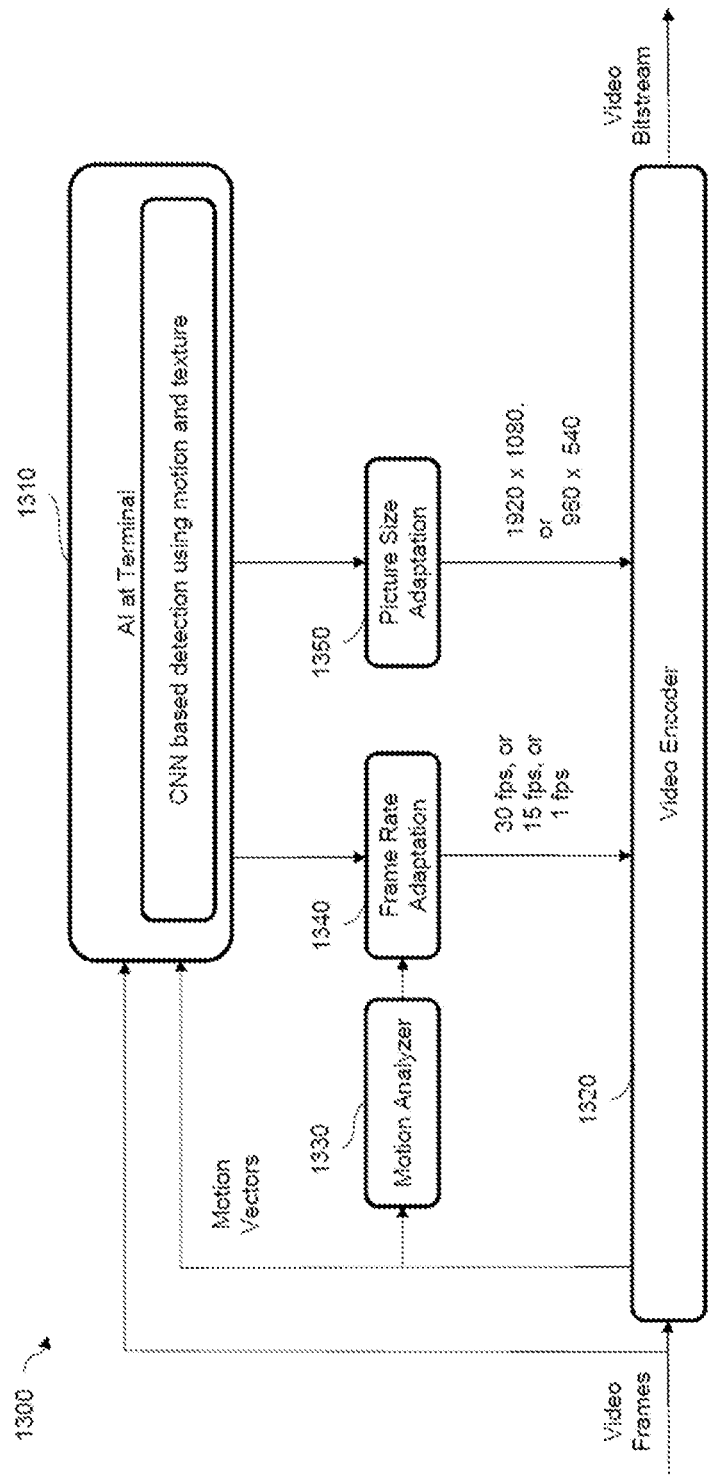
FIG. 11B is a block diagram of FIG. 11A, with added picture size adaptation.
Figure 11C:
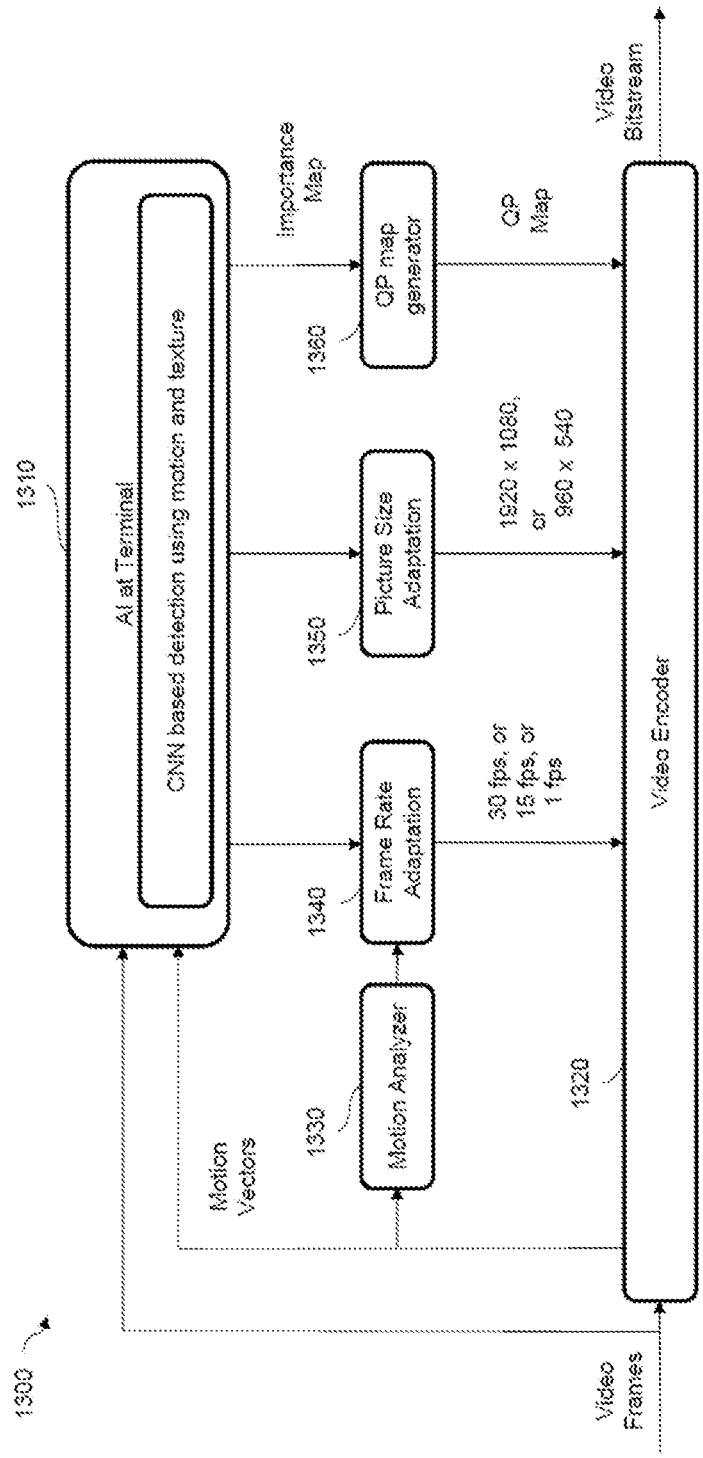
FIG. 11C is a block diagram of FIG. 11B, with added QP map generator.

As shown in FIGS. 11A to 11C, the motion is determined by the motion analyzer 1330. The analyzer is input with motion vectors as exemplary motion information, and provided by the video encoder 1320 for example.

Various quantities may be calculated by the motion analyzer as motion, based on the motion vectors. For example, the motion may be the maximum motion of a video frame, with the maximum motion being measured in terms of the maximum motion velocity.

In case of the motion being the maximum motion velocity, the motion analyzer is configured to perform the following steps (assuming p=2 in the p-norm).

Step 1: Collect the motion vectors (MVs) for each CTU separately.

Step 2: Compute for each MV=(vx,vy) the magnitude of motion velocity v=sqrt (vx2+vy2).

Step 3: Filter out velocity outliers for each CTU according to a certain percentage of the largest velocity for each CTU (for example: 10%).

Step 4: Determine the maximum value vmax=MAX(v) of all the remaining velocity values for the complete video frame.

Step 5: Test if vmax<T (T is a heuristic predefined threshold value, this may for instance be 100 pixels).

Step 6: If condition in step 5 is always "true" for a sliding window of video frames till the current one inclusive, a lower video frame rate is signaled to the video encoder for coding.

Step 7: If condition in step 5 is "false" for the current video frame, the original video frame rate is signaled to the video encoder for coding.

Other types of motion may be calculated in addition or alternatively. For example, the pixel-wise or block-wise motion vectors may be used to calculate statistical information related to motion statistics, including mean (i.e. mean motion or median motion) and/or standard deviation and/or skewness of the (motion) velocity, for example. Depending on any of such value, any of the coding parameters related to temporal or spatial resolution may be adapted accordingly, in addition to the output of the learning model.

In the above step-flow-chart, the frame rate adaptation 1340 is part of the motion analyzer 1330, since the motion analyzer also performs the adaptation and the signaling of the adapted frame rate to the video encoder 1320.

However, as shown in the exemplary embodiment of FIGS. 11A to 11C, the motion analyzer 1330 and the frame rate adaptation 1340 may perform the motion calculation and the parameter adaptation separately by different processing circuitries. This means that the signaling of the adapted frame rate to the encoder 1320 is performed by the frame rate adaption 1340.

The described embodiments, specify how information is determined, which is used as input data for performing now the adaptation of the coding parameters. To recall, this entire information is obtained by use of motion information through e.g. motion vectors or video image, in conjunction with image texture and object detection.

With reference to FIGS. 11A to 11C, it is described next how the outputs of the motion analyzer 1330 and the machine-learning model 1310 are used to adapt the respective coding parameters by the exemplary modules frame rate adaptation 1340, picture size adaptation 1350, and a QP map generator 1360. Their functionality is described with reference to FIGS. 11A to 11C.

According to an embodiment, the processing circuitry is configured to determine the coding parameter by adapting the frame rate of the video images according to motion.

According to an embodiment, the frame rate is adapted in accordance with the amount of the motion detected in the video image. In addition or alternatively, the frame rate is adapted by setting the frame rate to a higher value when an object was detected in the video frame than in case no object was detected.

For example, with the maximum motion velocity vmax as the motion, the frame rate is increased when vmax is equal to or larger than a preset value T. In turn, when the object moves slowly, corresponding to a vmax smaller than the preset threshold T, the frame rate may be retained or lowered.

That is, the frame rate is adapted based on the amount of motion contained of the video frame (i.e. the calculated output of the motion analyzer 1330) and/or whether or not an object is detected in the video frame (i.e. the output of the machine-learning model 1310).

For example, the frame rate may be increased from 15 frame per second (fps) to 30 fps, when an object is detected and the motion is larger than a certain (empirical) predefined value. The frame rate of 30 fps is typical for normal and fast motion video clips. In turn, when an object is not detected at all corresponding to that the machine-learning based model has not classified a sample or block of samples as ROI, then no motion information is considered and the frame rate is lowered to 1 fps, for example.

Next, the adaptation of the coding parameters related to spatial resolution is discussed.

According to an embodiment, the processing circuitry is configured to determine the coding parameter by adapting the spatial resolution based on whether or not an object is detected in the video image. The parameter related to spatial resolution is picture size, for example.

Moreover, according to an embodiment, the coding parameter related to spatial resolution, being a number of samples per video image, is set to a higher value of the spatial resolution when an object is detected in the video image than when no object is detected.

As shown in FIG. 11B, the module picture size adaption 1350 uses the output of the machine-learning model 1310 (i.e. the result of the object detection) as input and adapts the picture size (i.e. use of the original resolution or the alternative resolution(s)) based on the object detection result. If no object has been detected in a sliding window of a time up to now, the resolution will be lowered from the default resolution, corresponding to a smaller picture size. If any object is detected in the current frame, the original (i.e. higher) resolution is taken. The adapted coding parameter picture size is signaled by the module 1350 to the video encoder 1320.

In full HD, the default resolution is 1920×1080 (corresponding to picture size). An alternative of a lower resolution is 960×540. Thus, the picture size is a coding parameter related to spatial resolution. The specified pixel numbers specifying picture sizes are not limited thereto. These may alter with advancing video image and display technology toward even higher spatial resolution, resulting in a larger picture size. For example, the default resolution in 4*k* technology will be 3840×2160, with 1920×1080 or 960×540 being the lower alternative resolutions.

According to an embodiment, the coding parameter related to spatial resolution is a QP.

The quantization parameter refers to the inverse number of bits used for encoding. Thus, a small QP value corresponds to a large number of bits, respectively, a large number of smaller increments. As a result, finer spatial variations within the video image may be encoded, improving image quality.

According to an embodiment, the quantization parameter for a sample is set lower when the sample belongs to the ROI than in case the sample belongs to RONI.

As shown in FIG. 11C, the adaption (i.e. the setting) of the quantization parameter is performed by the QP map generator 1360, which uses the importance map (i.e. the ROI-RONI map) as input. This map is provided as output by the machine-learning model 1310. The QP map generator uses this importance map to generate a corresponding map of the quantization parameters. As described before, the ROI-RONI map may be a bitmap, wherein it is indicated bit-wise whether a sample or a block of samples belongs to ROI or RONI.

In case of standard HEVC codecs, this indication is done on a CTU/CU basis for compatibility reasons. When a bitmap is used, its entries contain for each CTU of a video frame either a value of "1" or "0" if it is an ROI or RONI. The QP map generator 1360 uses this bitmap and adapts the coding parameter QP for each CTU/CU according to whether the respective entry in the bitmap is "1" or "0". When the CTU (or the coding block) is ROI, as indicated by the bit value "1" in the importance map, the module 1360 sets the QP value to a lower value corresponding to a higher bit resolution. That is, spatial gradations in the image content (in terms of luma and/or chroma) can be resolved by a larger number of (differing) values.

In turn, when the CTU/CU is RONI, as indicated by the bit value "0", the QP value is increased. The latter case would apply, for example, when the image content of the CTU/CU were a part of a sky, which has a weak, i.e. nearly homogeneous texture and/or no motion. Thus, in this exemplary case the content does not display strong spatial variations. A low(er) number of bits corresponding to a large QP value may be sufficient for encoding this part of the frame.

Based on the importance (bit)map, the QP map generator 1360 generates a corresponding QP map, which contains the adapted QP value for a CTU/CU of the frame. This QP map is signaled by the module 1360 to the video encoder 1320.

The object detection leads further to some bounding boxes for the ROI. For example, if a coding block CTU/CU is completely or partly within the ROI, a smaller QP value is assigned to this block. This leads to a higher image quality. In turn, when a coding block is completely within the RONI, a higher QP value is assigned to this block, resulting in a lower quality of the image.

For HEVC, the difference between the smaller QP and the higher QP may be 12. However, this may be changed depending on the desired image quality of the ROI.

According to an embodiment, method is provided for encoding samples of a video image comprising the steps of determining motion information for samples of a block in the video image, determining a coding parameter based on an output of a machine-learning-based model, to which the motion information and the samples of the block are input, and encoding the video frame by applying the coding parameter.

According to an embodiment, a computer-readable non-transitory medium stores a program, including instructions which when executed on a processor cause the processor to perform the steps of the method.

FIG. 12 shows an exemplary embodiment, wherein the machine-learning engine, the encoder, the motion analyzer, and the parameter adaption described before, are part of a complete machine-vision-oriented video (en)coding system.

At the terminal side, there is a pipeline of an image signal processor ISP 1402, object detection by a CNN 1410, and video encoder 1440. The raw data from a camera sensor, including a lens 1401, are processed by the ISP, which results in video frames, for example, in an RGB format. Other alternative formats are possible such as YUV, YCbCr, or the like. Next, a CNN as one possible machine-learning model is used to apply the object detection algorithm to each of the RGB images. Finally, the detection result is used in the spatial-temporal adaptation 1420 and QP map generator 1430 for video coding. The coded video is transmitted to the cloud side 1480 (e.g. a could server) through a network 1450, that may be a wired/wireless and/or mobile/immobile network.

The embodiments enable to perform a more accurate and reliable image segmentation of video images, using a machine-learning-based model, which is fed with motion information (e.g. motion vectors) of a frame and the video image, including image texture. The classification of a sample or a group of samples of a block (e.g. CTU/CU) of the video image as belonging to ROI or RONI, and the object detection using texture allows adaptation of spatial and temporal coding parameters in accordance with the result of the object detection, ROI-RONI segmentation and motion information.

As a result, the embodiments enable to adapt the coding complexity for a region within the video image and/or one of its frames by further tuning these parameters to image changes (i.e. time resolution such as frame rate) and to the importance and size of one or multiple detected moving objects (i.e. spatial resolution such as picture size or quantization parameter).

This improves the performance of automated computer-vision algorithms and apparatuses for machine vision applications, including image encoding/coding with optimal coding parameters.

Thus, the embodiments provide the advantageous effects of a more accurate background extraction and object detection, as relevant for video surveillance, computer-vision driven video (en)coding, or autonomous driving, where both texture, motion, and object detection are important.

The approach disclosed by the embodiments may be used and implemented on chips, in surveillance cameras, or other consumer devices with cameras having object-detection functionality.

Summarizing, the present disclosure relates to encoding of a video image using coding parameters, adapted on basis of motion of the video image and of an output of a machine-learning based model, which is fed with samples of a block of the video image and motion information of the samples. With this input along with texture, the machine-learning model segments the video image into regions based on the strength of motion determined from the motion information. An object is detected within the video based on motion and texture, and the spatial-time coding parameters are determined based on strength of the motion, and whether or not the detected objects moves. The use of the machine-learning model, fed with motion information and block samples, combined with texture information of the object allows for a more accurate image segmentation, and thus optimization of coding parameters depending on the importance of the image content in terms of less relevant background and dynamic image content, including fast and slow moving objects of different sizes.

What is claimed is:

1. An apparatus comprising:
   a memory configured to store computer-executable instructions; and a processor coupled to the memory, wherein the computer-executable instructions cause the processor to be configured to:
  determine motion information for a first sample in a video image;
  input the motion information and the first sample into a machine-learning-based model to obtain a first output comprising a map indicating a region of interest (ROI) and a region of non-interest (RONI);
  determine a motion for the first sample based on the motion information;
  determine, based on the first output, an adaptive coding parameter of the first sample according to an amount of the motion determined for a quantity of pixels in the ROI of the first sample that exceeds a predefined threshold, wherein the amount of motion is based on a change of luma or a change of color intensity for the quantity of pixels; and
  encode the first sample by applying the adaptive coding parameter.

2. The apparatus of claim 1, wherein the first sample is one of a predetermined number of samples in a first block, and wherein the computer-executable instructions further cause the processor to be configured to determine the motion information based on a first motion vector of the first block.

3. The apparatus of claim 1, wherein the computer-executable instructions further cause the processor to be configured to:
  divide the video image into a plurality of coding tree units, wherein each of the coding tree units has a first size;
  hierarchically split a first coding tree unit of the coding tree units into a plurality of first coding units;
  determine a second motion vector for each of the first coding units; and
  input the first coding tree unit and a plurality of the second motion vectors of the first coding units to the machine-learning-based model.

4. The apparatus of claim 3, wherein the computer-executable instructions further cause the processor to be configured to input the following to the machine-learning-based model:
  the first coding tree unit;
  a second block, for a second sample of the first coding tree unit, of a horizontal component of the second motion vector of a first coding unit to which the second sample belongs; and
  a third block, for the second sample, of a vertical component of the second motion vector of the first coding unit to which the second sample belongs, wherein the second block and the third block are of the first size.

5. The apparatus of claim 3, wherein the computer-executable instructions further cause the processor to be configured to:
  input a second coding tree unit into a first machine-learning-based sub-model to obtain a second output;
  input the second motion vectors into a second machine-learning-based sub-model to obtain a third output; and
  input the second output and the third output into a third machine-learning-based sub-model.

6. The apparatus of claim 1, wherein the computer-executable instructions further cause the processor to be configured to classify, using the machine-learning-based model, the first sample as belonging to the ROI of the video image or to the RONI of the video image.

7. The apparatus of claim 6, wherein the computer-executable instructions further cause the processor to be configured to obtain, as the first output from the machine-learning-based model, a map indicating the ROI and the RONI, wherein the map comprises, for each fourth sample or a fourth block of a plurality of samples, an indication indicating whether the fourth sample or the fourth block belongs to the ROI or the RONI.

8. The apparatus of claim 6, wherein the computer-executable instructions further cause the processor to be configured to set a first quantization parameter (QP) for the first sample when the first sample belongs to the ROI and set a second QP for the first sample when the first sample belongs to the RONI, and wherein the first QP is lower than the second QP.

9. The apparatus of claim 6, wherein the computer-executable instructions further cause the processor to be configured to further determine the coding parameter by adapting a first spatial resolution based on whether or not an object was detected in the video image.

10. The apparatus of claim 9, wherein the computer-executable instructions further cause the processor to be configured to set a second spatial resolution when the object was detected in the video image and set a third spatial resolution when the object was not detected in the video image, wherein the second spatial resolution is higher than the third spatial resolution, and wherein the first spatial resolution, the second spatial resolution, and the third spatial resolution indicate a number of samples per a second video image.

11. The apparatus of claim 9, wherein the coding parameter related to the first spatial resolution is a quantization parameter (QP).

12. The apparatus of claim 1, wherein the computer-executable instructions further cause the processor to be configured to detect, using the machine-learning-based model, an object within the video image.

13. The apparatus of claim 1, wherein the computer-executable instructions further cause the processor to be configured to determine the coding parameter by adapting a first frame rate of video images according to the motion.

14. The apparatus of claim 13, wherein the computer-executable instructions further cause the processor to be configured to calculate the motion for the first sample based on a metric of a first motion vector of a first block, and wherein the first sample is located in the first block.

15. The apparatus of claim 14, wherein the computer-executable instructions further cause the processor to be configured to:
  set a second frame rate when an object was detected in the video image higher than a third frame rate when the object was not detected in the video image; or
  set a fourth frame rate in accordance with an amount of the motion detected in the video image.

16. A method comprising:
  determining motion information for a first sample of a first block in a video image;
  inputting the motion information and the first sample into a machine-learning-based model to obtain a first output comprising a map indicating a region of interest (ROI) and a region of non- interest (RONI);
  determining a motion for the first sample based on the motion information;
  determining, based on the first output, an adaptive coding parameter of the first sample according to an amount of the motion determined for a quantity of pixels in the ROI of the first sample that exceeds a predefined threshold, wherein the amount of motion is based on a change of luma or a change of color intensity for the quantity of pixels; and encoding the video image by applying the adaptive coding parameter.

17. The method of claim 16, further comprising:

dividing the video image into a plurality of coding tree units, wherein each of the coding tree units has a first size;

hierarchically splitting a first coding tree unit of the coding tree units into a plurality of first coding units;

determining a first motion vector for each of the first coding units; and inputting the first coding tree unit and a plurality of motion vectors of the first coding units to the machine-learning-based model.

18. The method of claim 17, further comprising inputting the following to the machine-learning-based model:

the first coding tree unit;

a second block, for a second sample of the first coding tree unit, of a horizontal component of the second motion vectors of a first coding unit to which the second sample belongs; and a third block, for the second sample, of a vertical component of the second motion vectors of the first coding unit to which the second sample belongs, wherein the second block and the third block are of the first size.

19. The method of claim 17, further comprising:

inputting the first coding tree unit into a first machine-learning-based sub-model to obtain a second output;

inputting the second motion vectors into a second machine-learning-based sub-model to obtain a third output; and inputting the second output and the third output into a third machine-learning-based sub-model.

20. A computer program product comprising computer-executable instructions stored on a non-transitory computer-readable medium that, when executed by a processor, cause an apparatus to:

determine motion information for samples of a block in a video image;

input the motion information and the samples to a machine-learning-based model to obtain an output comprising a map indicating a region of interest (ROI) and a region of non-interest (RONI);

determine a motion for the sample based on the motion information;

determine, based on the output, adaptive coding parameters of the samples according to an amount of the motion determined for a quantity of pixels in the ROI of the samples that exceeds a predefined threshold, wherein the amount of motion is based on a change of luma or a change of color intensity for the quantity of pixels; and encode the video image by applying the adaptive coding parameter.

* * * * *